United States Patent [19]

Chang

[11] Patent Number: 5,372,562

[45] Date of Patent: Dec. 13, 1994

[54] BICYCLE SIMULATOR WITH COLLAPSIBLE CONFIGURATION

[76] Inventor: John Chang, No. 1-2, Lane 975, Chun-Jih Road, Tao-Yuan City, Taiwan, Prov. of China

[21] Appl. No.: 175,511

[22] Filed: Dec. 30, 1993

[51] Int. Cl.5 .............................................. A63B 23/04
[52] U.S. Cl. ...................................... 482/57; 482/908
[58] Field of Search ................ 482/57, 58, 59, 62, 482/63, 64, 908, 148

[56] References Cited

U.S. PATENT DOCUMENTS

| | | | |
|---|---|---|---|
| 2,641,249 | 6/1953 | Brockman | 482/57 |
| 4,587,960 | 5/1986 | Schotten | 482/57 |
| 4,632,386 | 12/1986 | Beech | 482/57 |
| 4,700,942 | 10/1987 | Danchulis | 482/57 |
| 4,720,094 | 1/1988 | Danchulis | 482/57 |

*Primary Examiner*—Stephen R. Crow
*Attorney, Agent, or Firm*—Morton J. Rosenberg; David I. Klein

[57] ABSTRACT

A bicycle simulator can be extended in normal use and retracted when not in use. The legs of the housing and the actuating rod, seat and handlebar housing can be retracted and stored within the box. Then the box can be easily carried by handle disposed at the upper position of the box, consequently, an easily portable bicycle simulator is achieved.

5 Claims, 25 Drawing Sheets

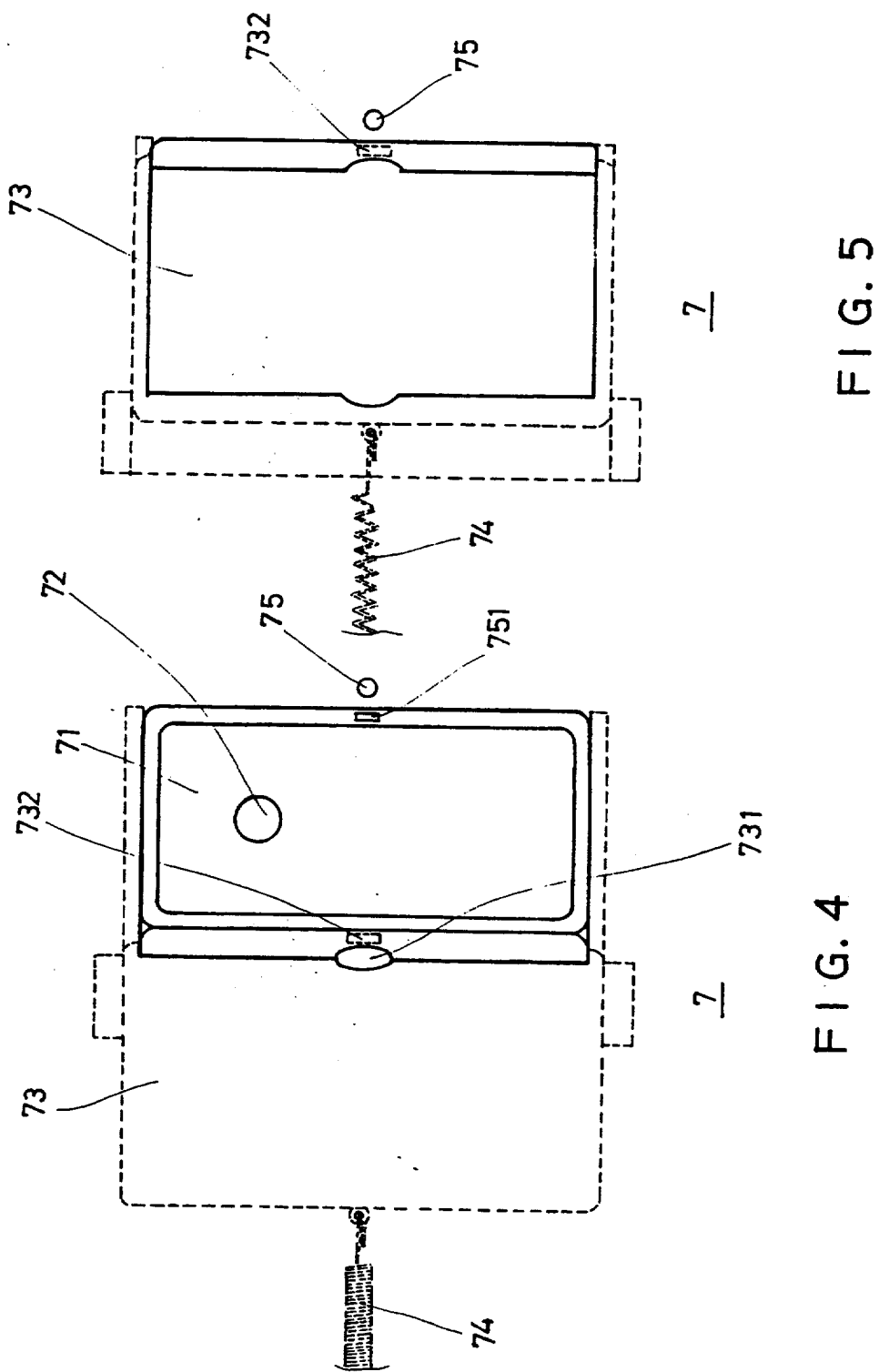

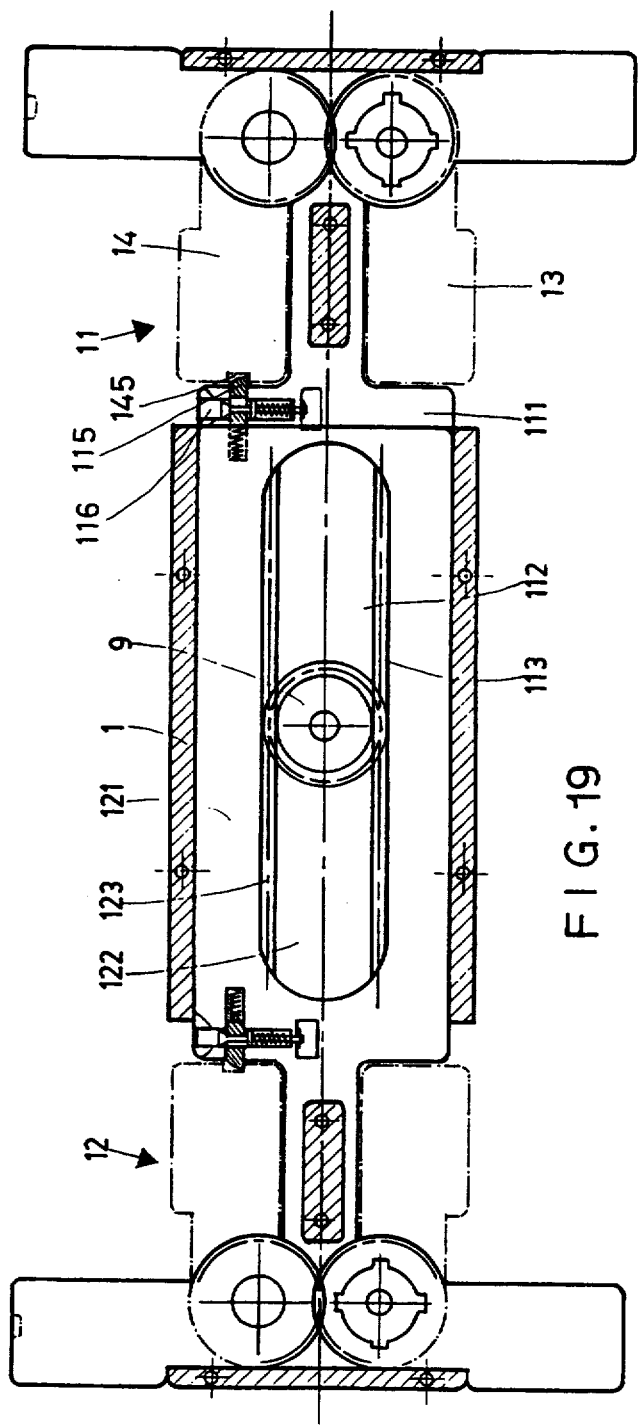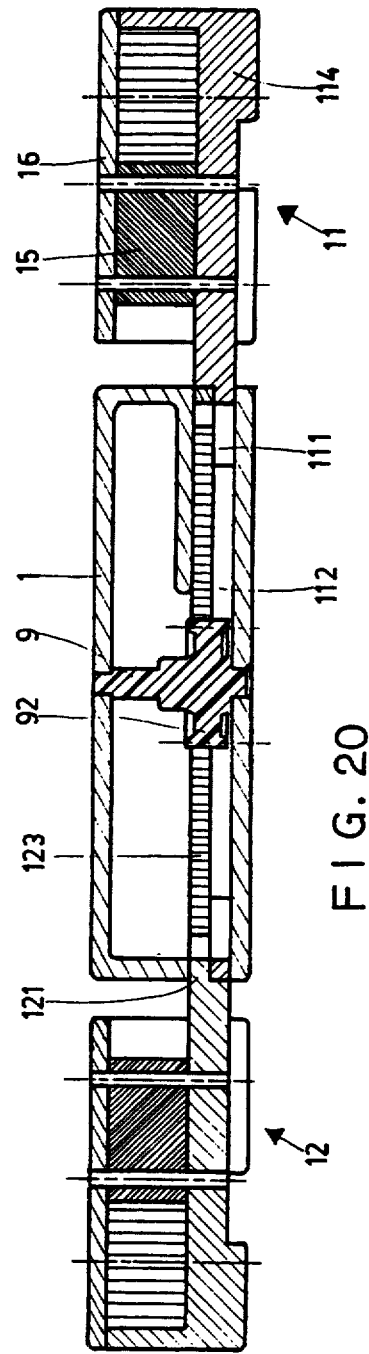
FIG. 19
FIG. 20

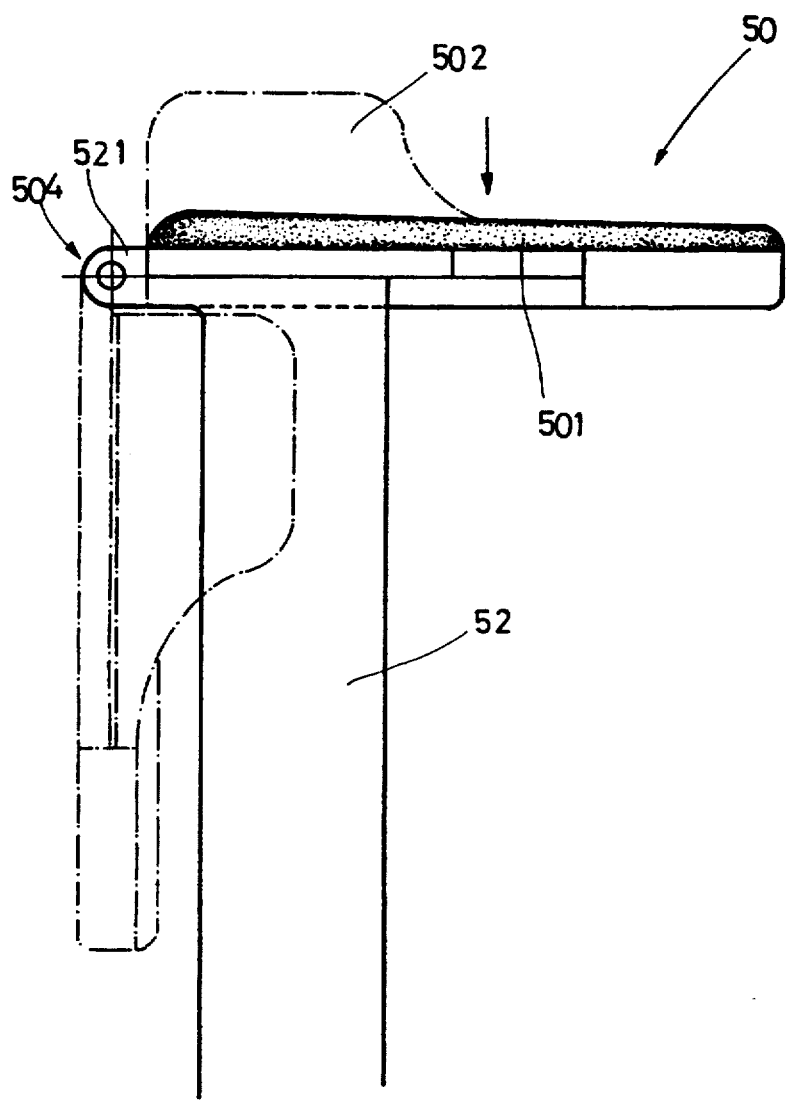
F I G. 25

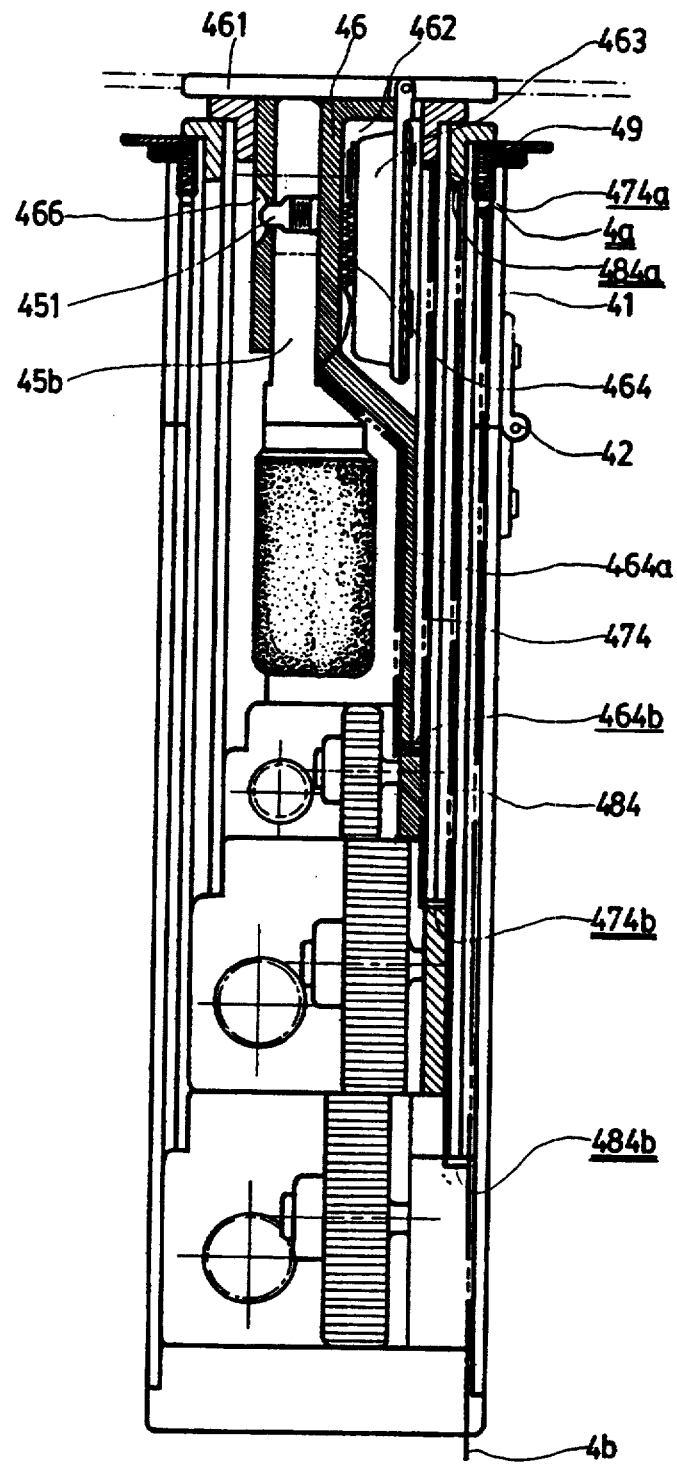
F I G. 31

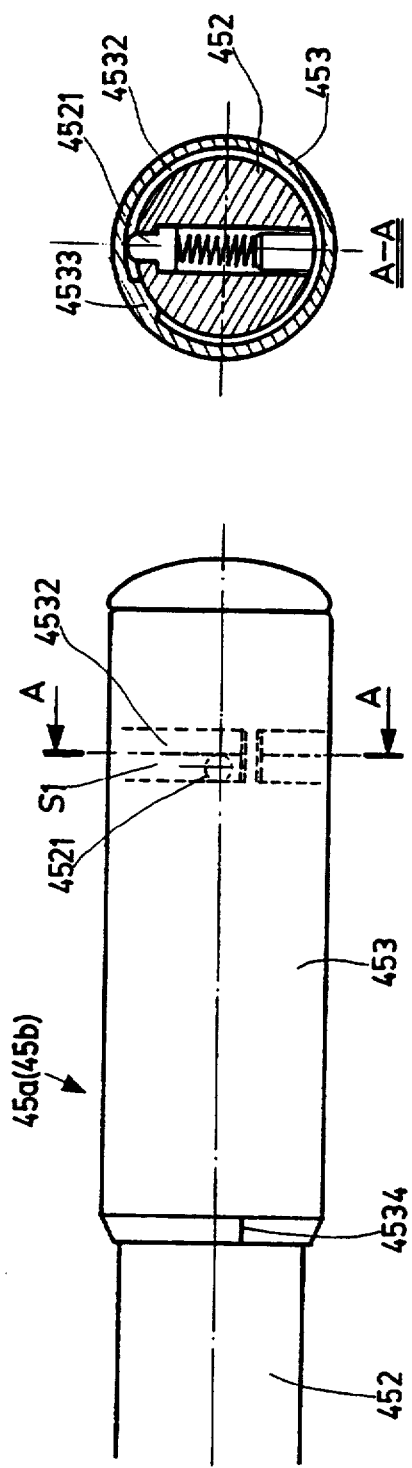
FIG. 33
FIG. 34
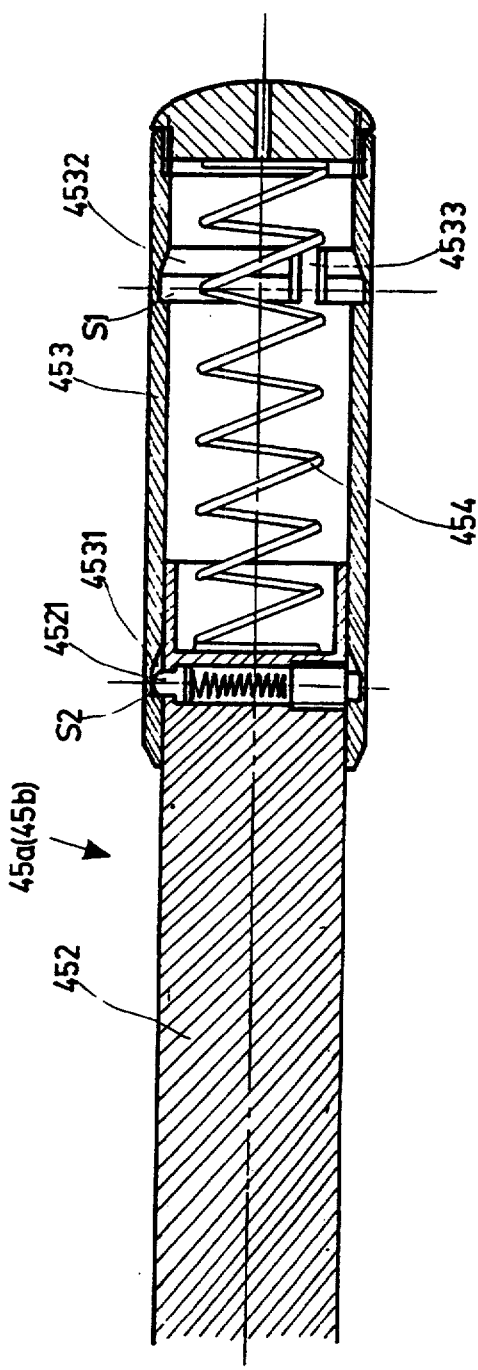
FIG. 35

BICYCLE SIMULATOR WITH COLLAPSIBLE CONFIGURATION

BACKGROUND OF THE INVENTION

This invention relates to a bicycle simulator, more particularly, to a bicycle simulator with collapsible configuration which can be transformed to a box for convenience and portable capability.

There are many kind of sporting equipment and the customer can use it for indoor exercise. One of the sporting equipment is bicycle simulator which has a similar configuration of bicycle and with easy tiding capability. In light of this, it is very popular to the customers. Even it serves as a bicycle simulator, it has the following defects.

1. The conventional bicycle simulator has a very large size which takes a large space when in use. On the other hand, all the mechanism in the bicycle simulator are fixed thereof. When the bicycle simulator is not in use, it becomes a redundant equipment.

2. Since the mechanism is not collapsible, the redundant space becomes a defect for export business.

3. The conventional bicycle simulator is heavy and with poor portable capability. Even the user hopes to ride it at outdoors, the configuration makes it impossible.

SUMMARY OF THE INVENTION

It is the object of this invention to provide a bicycle simulator with collapsible configuration which can retracted into a box when not in use or transportation.

It is still the object of this invention to provide a bicycle simulator wherein the seat, handlebar and pedal can be retracted into the box when not in use for easily transportation and store.

It is still the object of this invention to provide a bicycle simulator wherein the mechanism can be easily extended when necessary.

It is still the object of this invention to provide a bicycle simulator wherein the collapse or extension of the mechanism are operated mechanically without the use of the electricity.

It is still the object of this invention to provide a bicycle simulator wherein a controller is applied to extend or retract the mechanism smoothly and easily.

BRIEF DESCRIPTION OF THE DRAWINGS

The structural and operational characteristics of the present invention and its advantages as compared to the known state of the prior art will be better understood from the following description, relating to the attached drawings which show illustratively but not restrictively an example of a bicycle simulator with collapsible configuration. In the drawings:

FIG. 4 is a sketch view of this invention showing the sliding door in an opened position;

FIG. 5 is a sketch view of this invention showing the sliding door in a closed position;

FIG. 19 is a cross sectional view of the housing when viewed from top position;

FIG. 20 is a cross sectional view of the housing when viewed from side position;

FIG. 25 is a sketch view of the seat in a collapsible and extended position;

FIG. 31 is cross sectional view of the handlebar viewed from side position;

FIGS. 33 to 35 are sketch views showing the configuration of the handlebar.

DETAILED DESCRIPTION OF PREFERABLE EMBODIMENT

Figure 1:
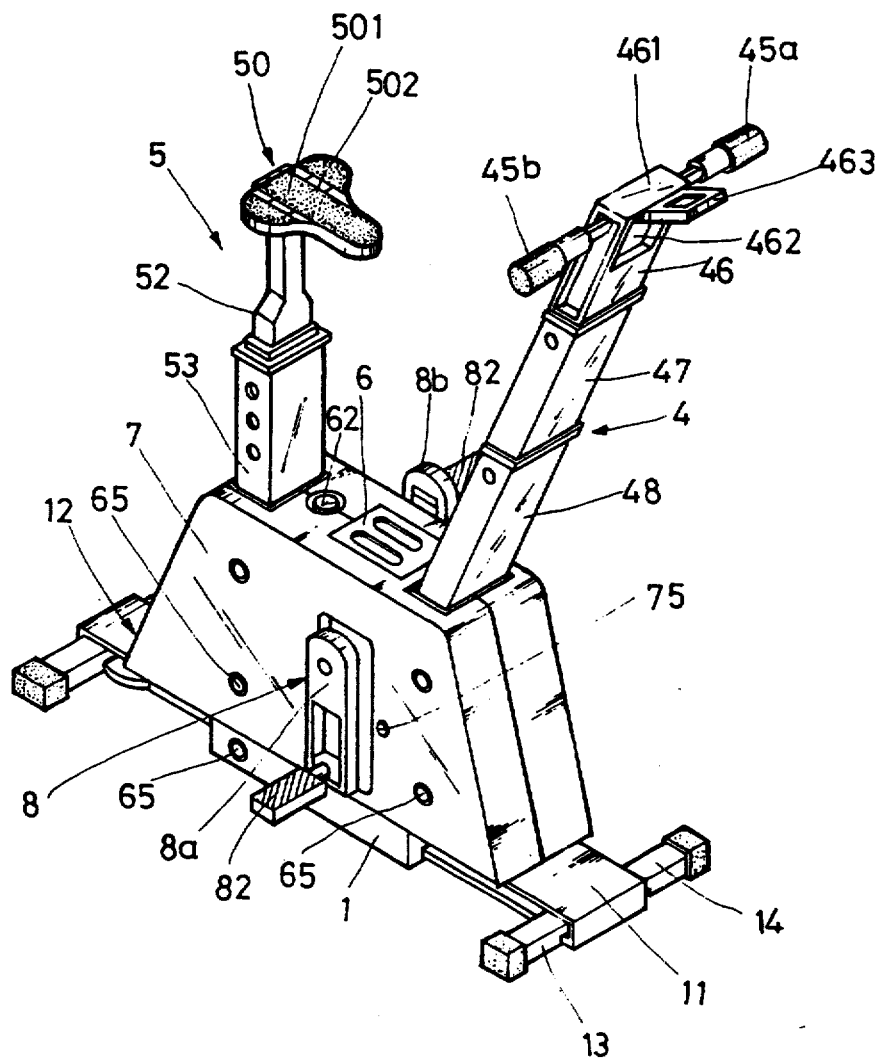
FIG. 1 is a perspective view of a bicycle simulator made according to this invention showing all the mechanisms fully extended.
Figure 2:
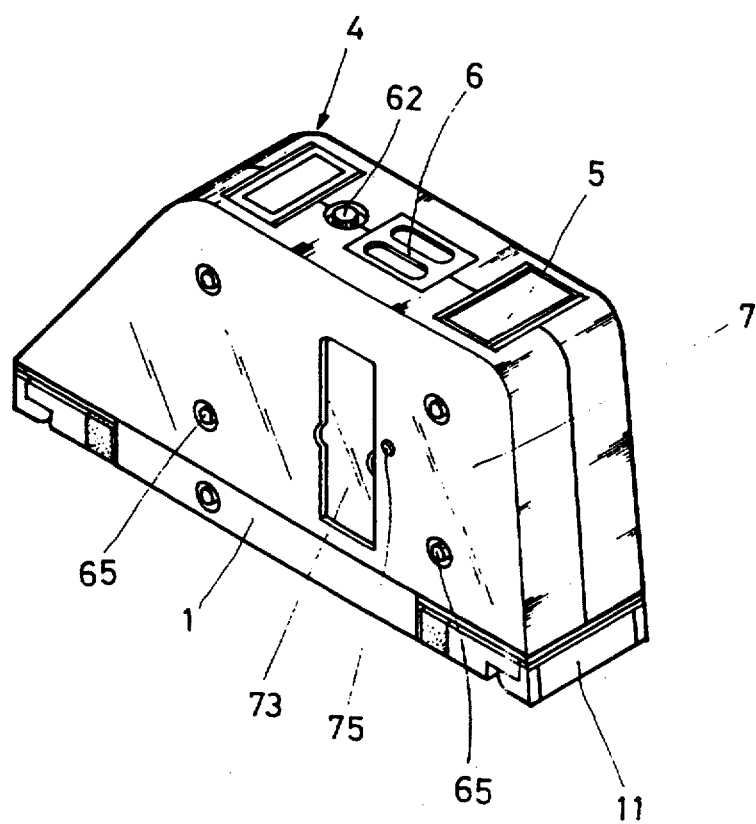
FIG. 2 is a perspective view of a bicycle simulator made according to this invention showing all the mechanisms fully collapsible.

Referring to FIG. 1, the bicycle simulator made according to this invention can be extended in normal use and retracted when not in use. The legs 11, 12 of the housing 1 and the actuating rod 8, seat 5 and handlebar housing 4 can be retracted and stored within the box 7, as shown in FIG. 2. Then the box 7 can be easily carried by handle 6 disposed at the upper position of the box 7, consequently, an easily portable bicycle simulator is achieved.

Figure 3:
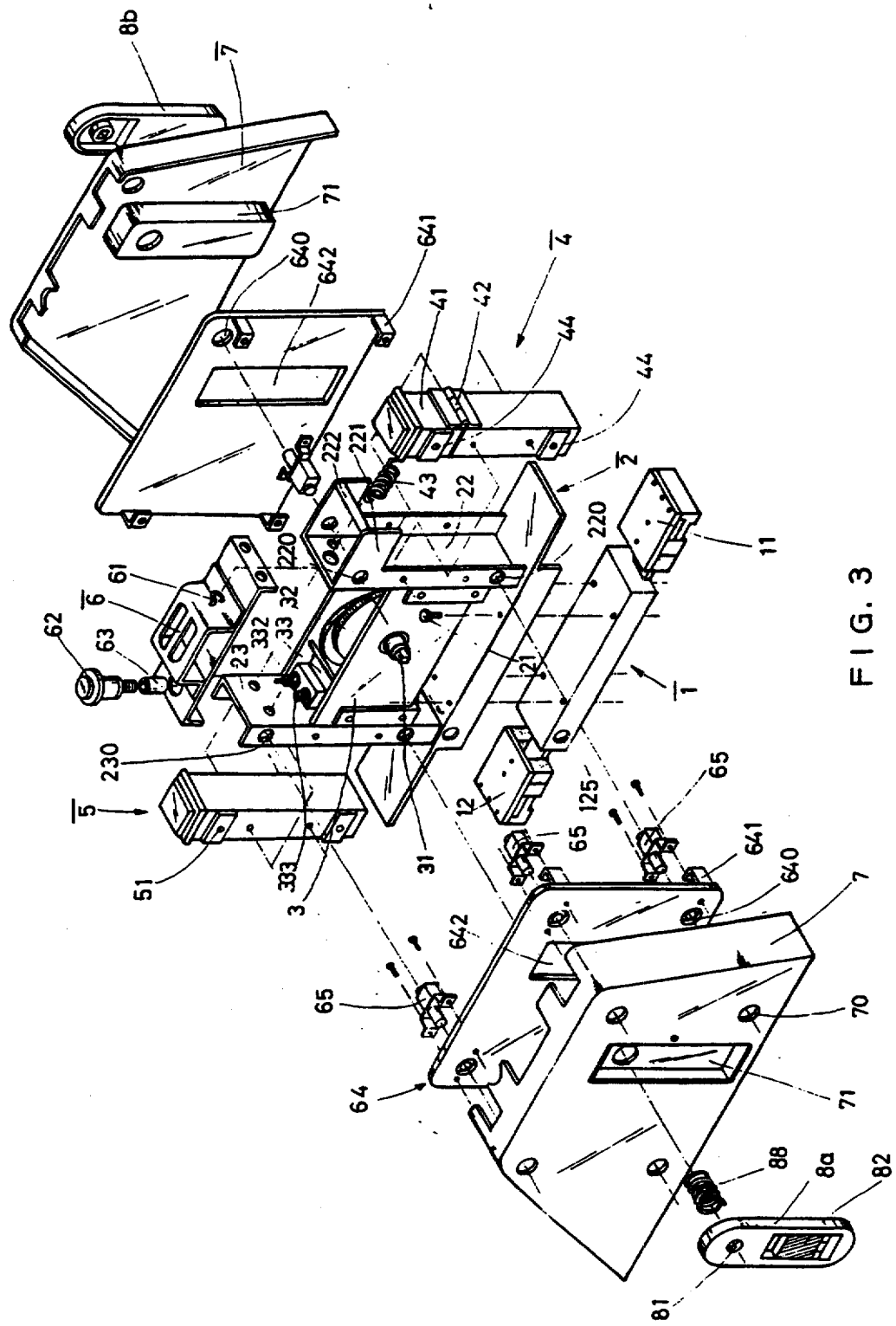
FIG. 3 is an exploded perspective view of a bicycle simulator made according to this invention showing all the mechanisms thereof.

Referring to FIG. 3, the bicycle simulator made according to this invention comprises a housing 1 which has a collapsible front leg housing 11 and a rear leg 12. A bracket 2 is attached to the housing 1 by means of screw members 21. An first U-type supporter 22 is vertically disposed in front of the bracket 2. A pair of lugs 221 which are parallel with each other are disposed at the upper position of the supporter 22. A positioning rod 222 is disposed between the lugs 221. A second U-type supporter 23 is disposed at the rear portion of the bracket 2. A plurality of through holes 220, 230 are provided at the side wall of the first and second supporter 22, 23.

A transmission box 3 is disposed at the upper position of the bracket 2. A driving shaft 31 is extended to both sides of the transmission box 3. A group of gears 32 is disposed within the transmission box 3 which is actuated by the driving shaft 31. A load adjusting device 33 which is interconnected with the gears 32 is further disposed inside the transmission box 3.

A handlebar housing 4 is attached to the first supporter 22. This handlebar 4 farther includes an upper portion 41 which is attached to the handlebar 4 by means of hinge 42. A spring member 43 is attached to the opposite side of the hinge 42. The other end of the spring member 43 is first passed through the first supporter 22 and then attached to a hooker 61 of the handle 6. A hole 44 is provided with respect to the hole 220 of the first supporter 22.

A seat 2 is fixed to the second U-type supporter 23. A hole 51 is disposed with respect to the hole 230 of the second supporter 23.

A handle 6 is attached to the first and second supporter 22, 23 respectively with both ends. An adjusting knob 62 is provided at the rear portion. This adjusting knob 62 is interconnected with the automatic adjuster 33 via a threaded sleeve 63.

A pair of positioning plates 64 is attached to the side portion of the first and second supporter 22, 23 respectively by means of the positioning plate 641 which extends inward. A hole 640 is disposed with respectively to the holes 220, 230 of the first and second supporter 22, 23. A controller 65 is disposed between said holes 640. A slot 642 is disposed with respective to the driving shaft 31.

A pair of housings 7 are attached to bracket 2. A hole 70 is disposed at the position with respect to the hole 640 of the positioning plate 64. An elongate recessed surface 71 is disposed at the housings 7 with respective to the slot 642. A hole 72 is disposed for the extension of the driving shaft 31.

A pair of actuating rods 8a, 8b are disposed respectively with the recessed surfaces 71. A hole 81 is disposed for interconnection of the actuating rods 8a, 8b and driving shaft 31. A pedal 82 is attached to the free end of the actuating rods 8a, 8b.

By assembling of these above described elements, a bicycle simulator is provided. This bicycle can be readily retracted to a collapsible when not in use and fully extended when in use.

The configuration of this bicycle simulator will be described detailedly.

Figure 6:
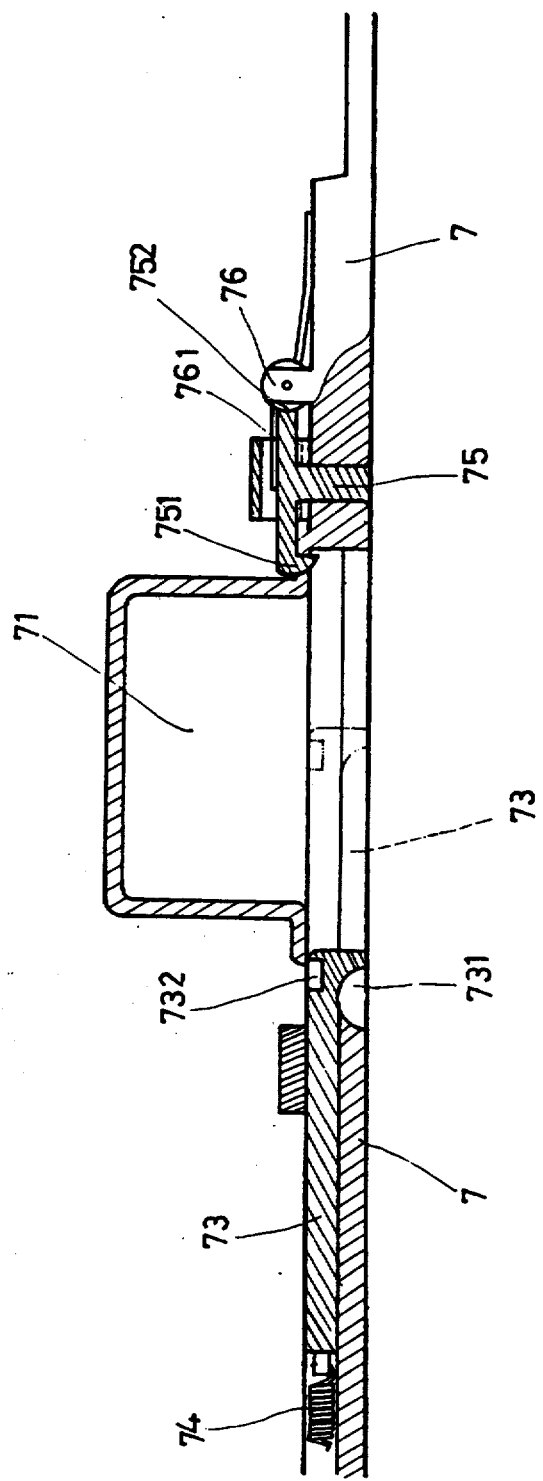
FIG. 6 is a sketch view of this invention showing the sliding door positioned in an opened position.

Referring to FIGS. 4, 5 and 6, the actuating rods 8a, 8b are received in those two recessed surface 71 of the housing 7, not shown in these Figures. A sliding door 73 is disposed at the outer side of the housing 7. A spring member 74 is provided at the rear end of the sliding door 73. A circular recessed portion 731 is provided for easily grasp of the finger. A retaining slot 732 is disposed at the inner side of the sliding door 73. At the opposite of the recessed surface 71, a trigger member 75 is disposed. This trigger member 75 has a hooker 751 which is projected into the housing 7. The rear end 752 of the trigger member 75 is pivoted to a lug member 75. This trigger member 75 is further biased by a spring member 761. When the sliding door 73 is puller out, the hooker 751 is retained on the retaining slot 732. Then the sliding door 73 is closed and positioned thereof. When the bicycle simulator is ready to use, pressing the trigger member 75 slightly to release the hooker 751 from the retaining slot 732. By the help of the spring member 74, the sliding door 73 is readily opened. By this arrangement, the actuating rods 8a, 8b are easily pulled out, not shown in Figures.

Figure 7:
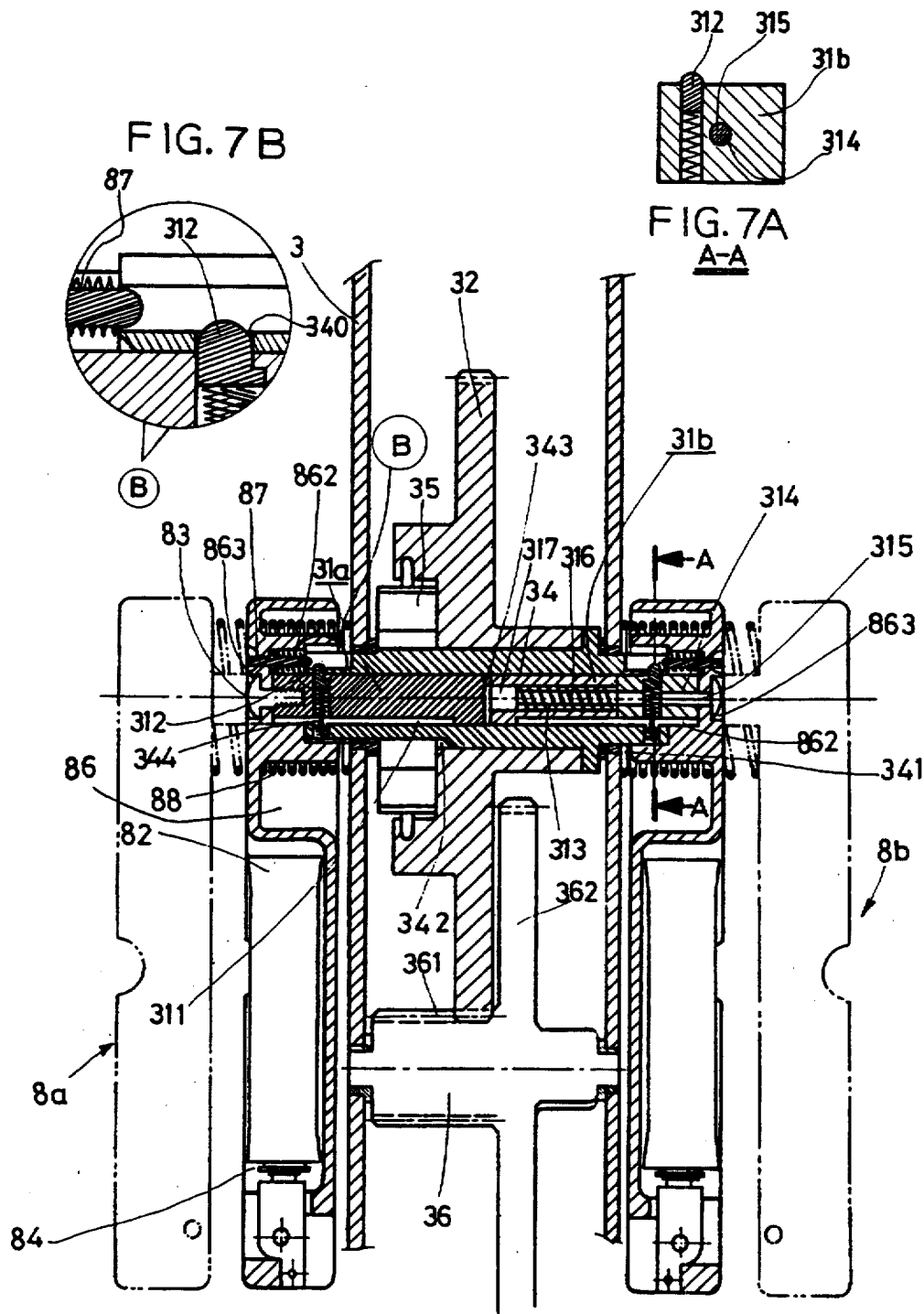
FIG. 7 is a sketch view of this invention showing the actuating rod in a retracted position.
Figure 8:
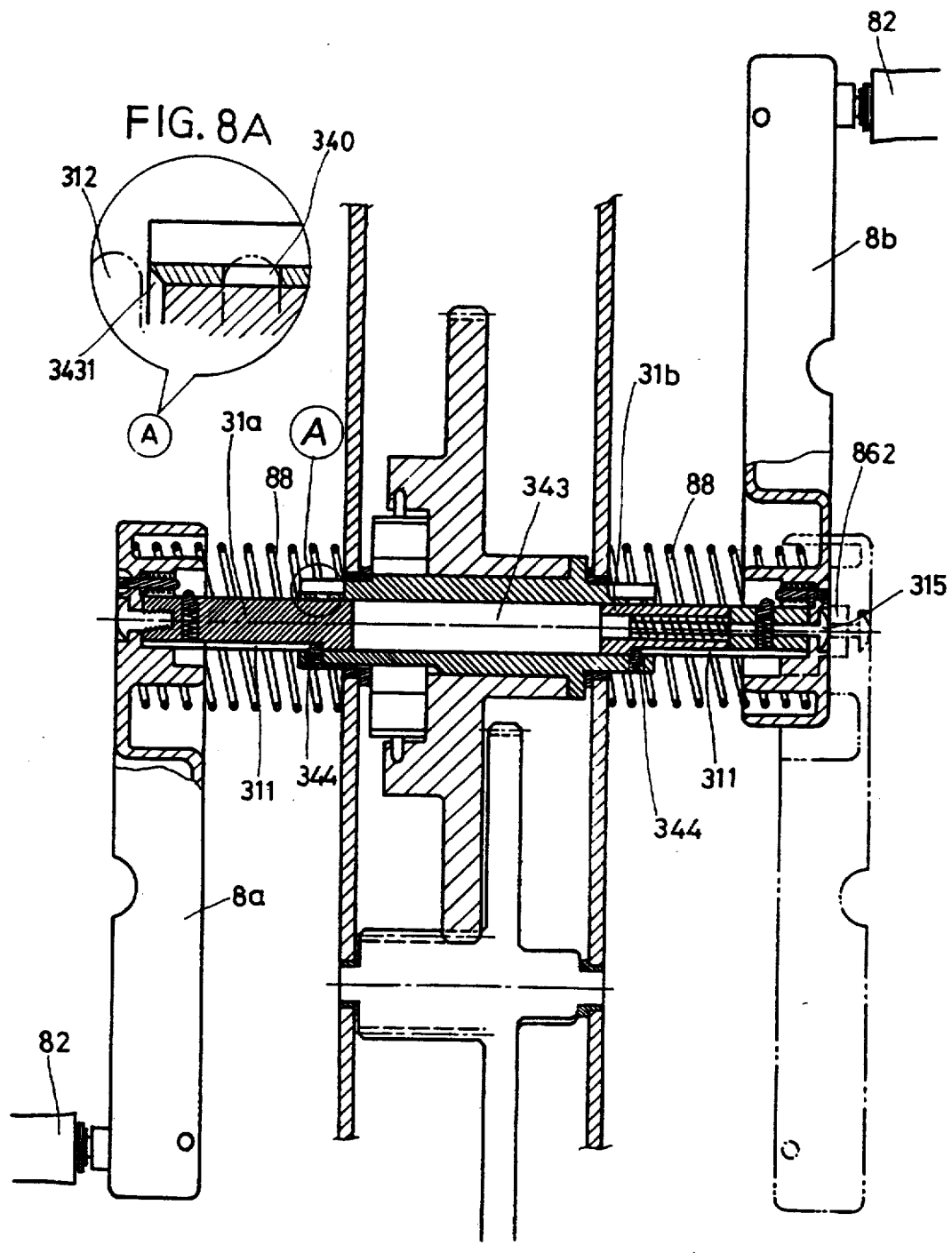
FIG. 8 is a sketch view of this invention showing the actuating rod fully extended.
Figure 9:
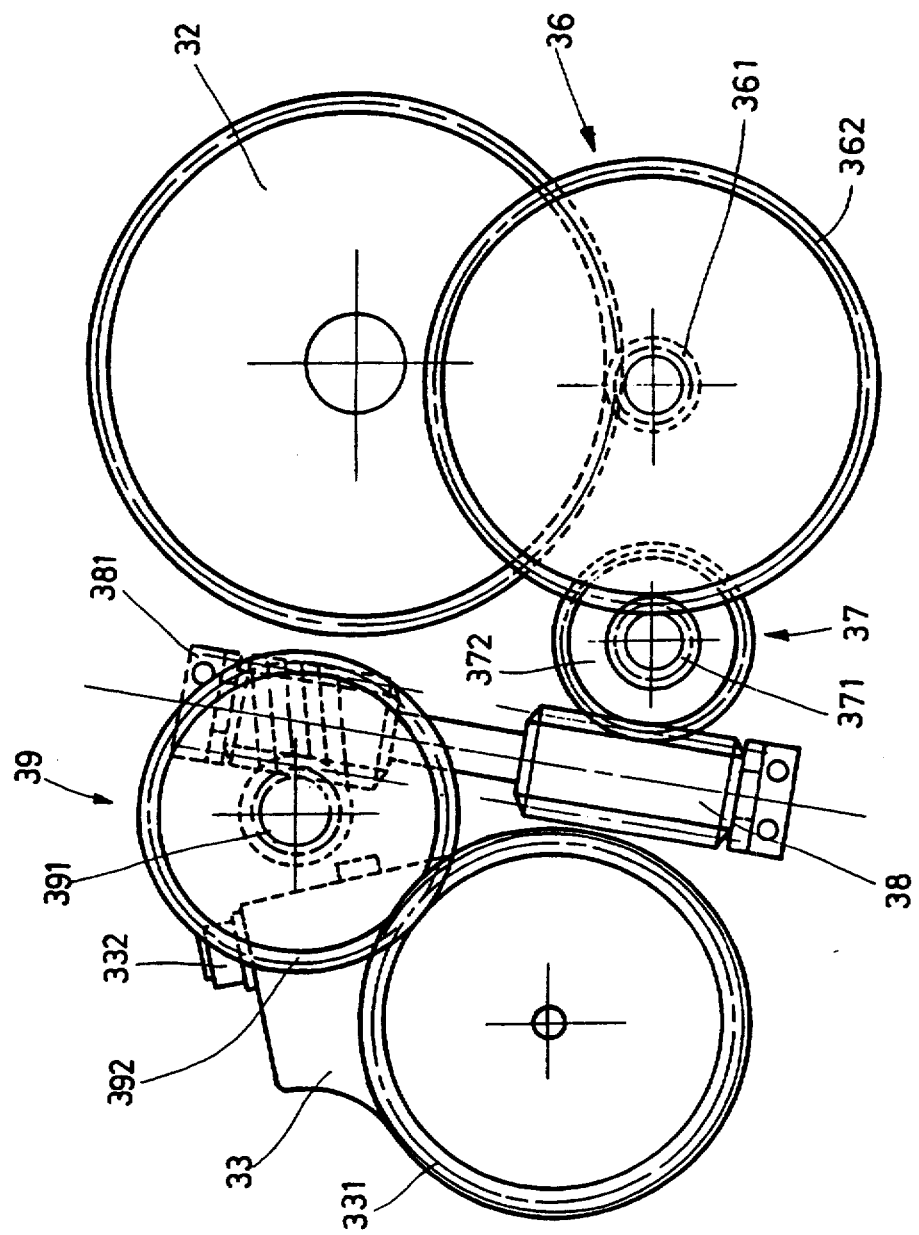
FIG. 9 is a sketch view of this invention showing the configuration of the transmission box.
Figure 10:
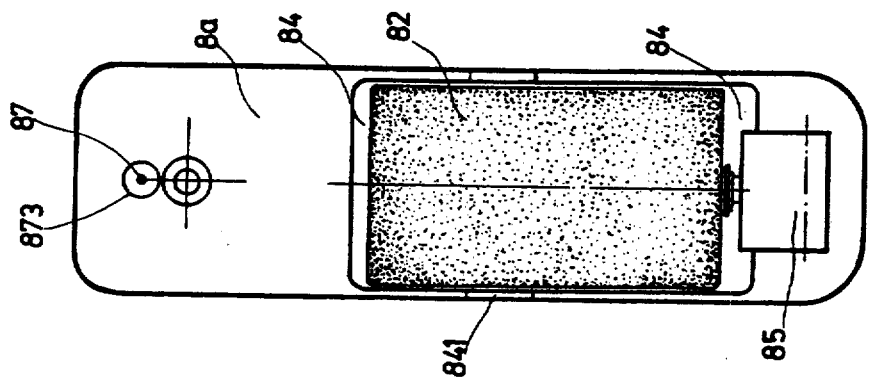
FIGS. 10 to 13 are sketch views of the actuating rod showing the actuating rod in different moving position.

Then, referring to FIGS. 7 and 8, the actuating rods 8a, 8b are positioned parallel on the positioning plate 64. The actuating rod 8a is fixed to the driving shaft 31a via screw 83. A sliding slot 311 is disposed at the upper position of the driving shaft 31a and a pin 312 which is biased by a spring member is disposed at the middle portion of the driving shaft 31a. These two driving shaft 31a, 31b are installed within a tube 34. This tube 34 is rotatable on the transmission box 3 by means of bushing 341 disposed at both ends. A fly-wheel 35 which can rotate only one way is keyed to the key slot 342 of the tube 34. When the fly-wheel 35 rotates, a first gear 32 which is sleeved on the tube 34 is rotated consequently. Then a pinion 361 of the gear 36 is rotated as well, as shown in FIG. 9. The larger pinion 362 of the second gear 36 then actuates the pinion 371 of the third gear 37. The worm 372 of the third gear 37 rotates a worm gear 38. Consequently, the worm 381 which meshes with the work gear 38 rotate the worm gear 391 of the forth gear 39. Accordingly the forth gear 392 is meshed with the gear 331 of the automatic load adjuster 33.

By this arrangement, when the driving shaft 31a, 31b rotate, the tube 34 rotates accordingly. When the tube 34 rotates clockwise, the fly-wheel 35 and the first gear 32 rotate. Then the second gear 36 and the pinion 361 rotate as well. The rotation is transferred to the larger pinion 362 which rotates the third gear 37. By this arrangement, the rotation is amplified considerably when it passes the first gear 32, the second gear 36, the third gear 37. The load increases largely as well. The sporting load is achieved by the gear group in the first stage.

The main function of the worm 38 is reduced the speed. In light of this, the speed of the forth gear 39 rotates slowly. Hence, the forth gear 39 meshes with the gear 331 of the load adjustor 33 smoothly. This is the second stage load adjusting. This load adjuster 33 is adjustable according to the demand of the user. The load adjustor 33 is interconnected to an adjusting knob 62 of the handle 6 by means of a connecting means 332, as shown in FIG. 3. When the adjusting knob 62 is rotated, the load adjustor 33 is set accordingly. The load adjustor 33 is described in the U.S. Pat. No. 5,108,091, hence no further detailed description is necessary. In fact, the sporting load in the second stage is adjustable as well.

Figure 11:
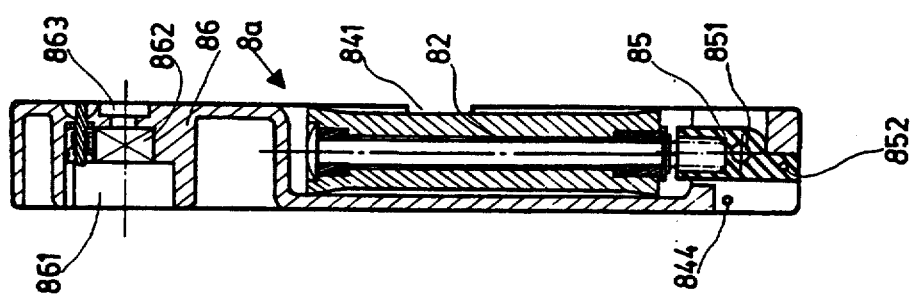
Figure 12:
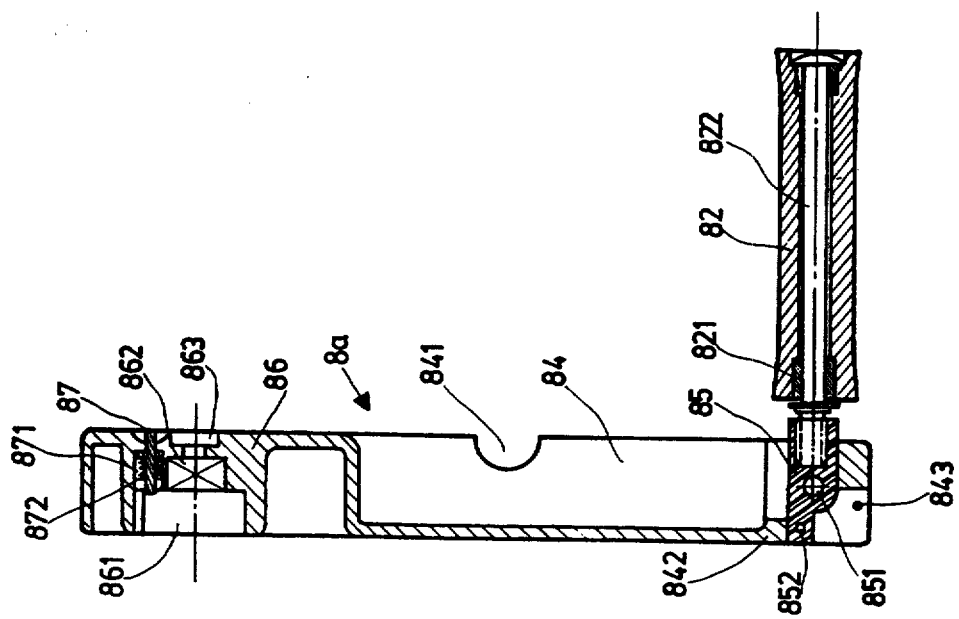

Referring to FIG. 7, the actuating rods 8a, 8b are attached to the driving shaft 31a, 31b respectively. The operation of the extension and retraction of the actuating rods 8a, 8b will be detailedly described later. As shown in FIG. 11, the front view of the actuating rods 8a, 8b and FIG. 11 the cross sectional view of the actuating rods 8a, 8b. FIG. 12 discloses a fully extended view. A recessed slot 84 is disposed at the middle portion of the actuating rod 8a. A circular cutout 841 is disposed at both sides of the slot 84 for receiving the pedal 82. Then the pedal 82 is extended horizontally.

The pedal 82 is rotatable of the shaft member 822 by means of a lubricated beating 821. The shaft member 822 is fixed to a rotating block 85 which is positioned to the actuating rod 8a by a center shaft 851. When the pedal 82 is extended, the rotating block 85 rotates for ninety (90) degrees. Hence the end portion 852 links against the projected block 842 to make the pedal 82 being positioned horizontally.

Figure 13:
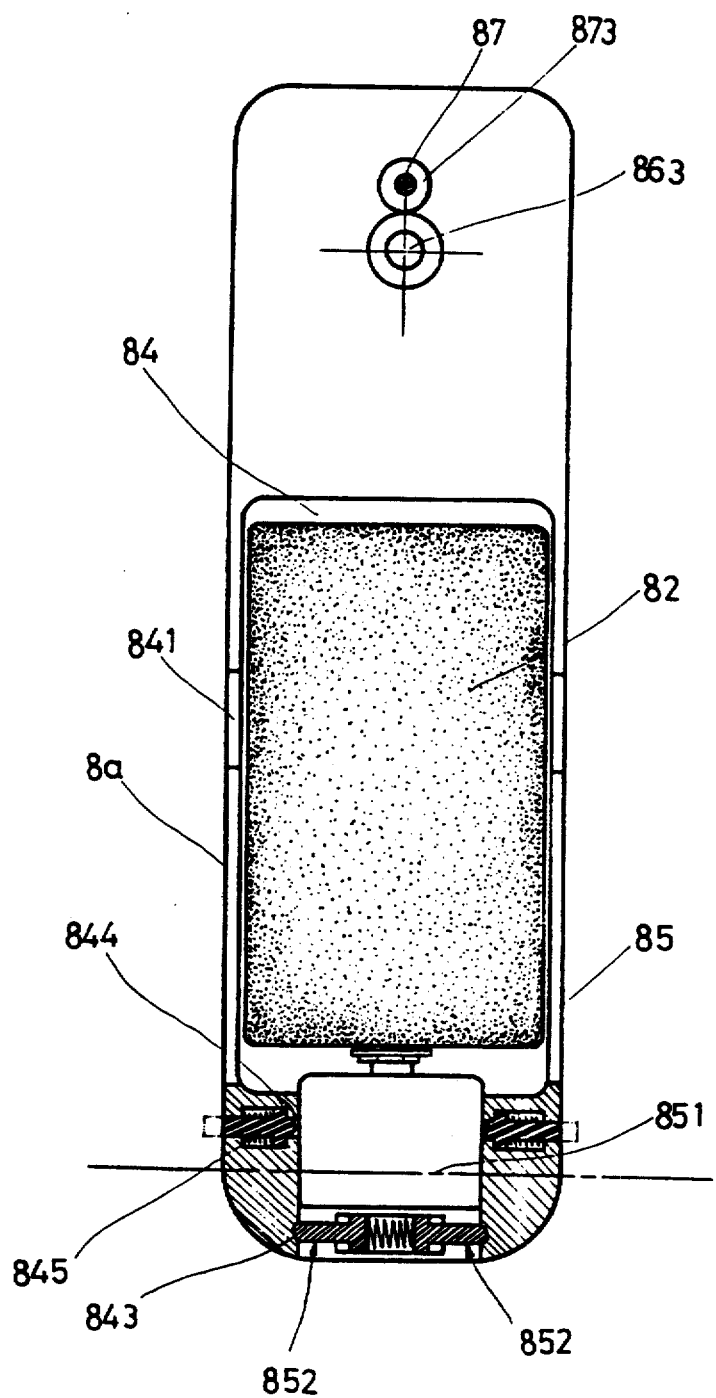
Figure 14:
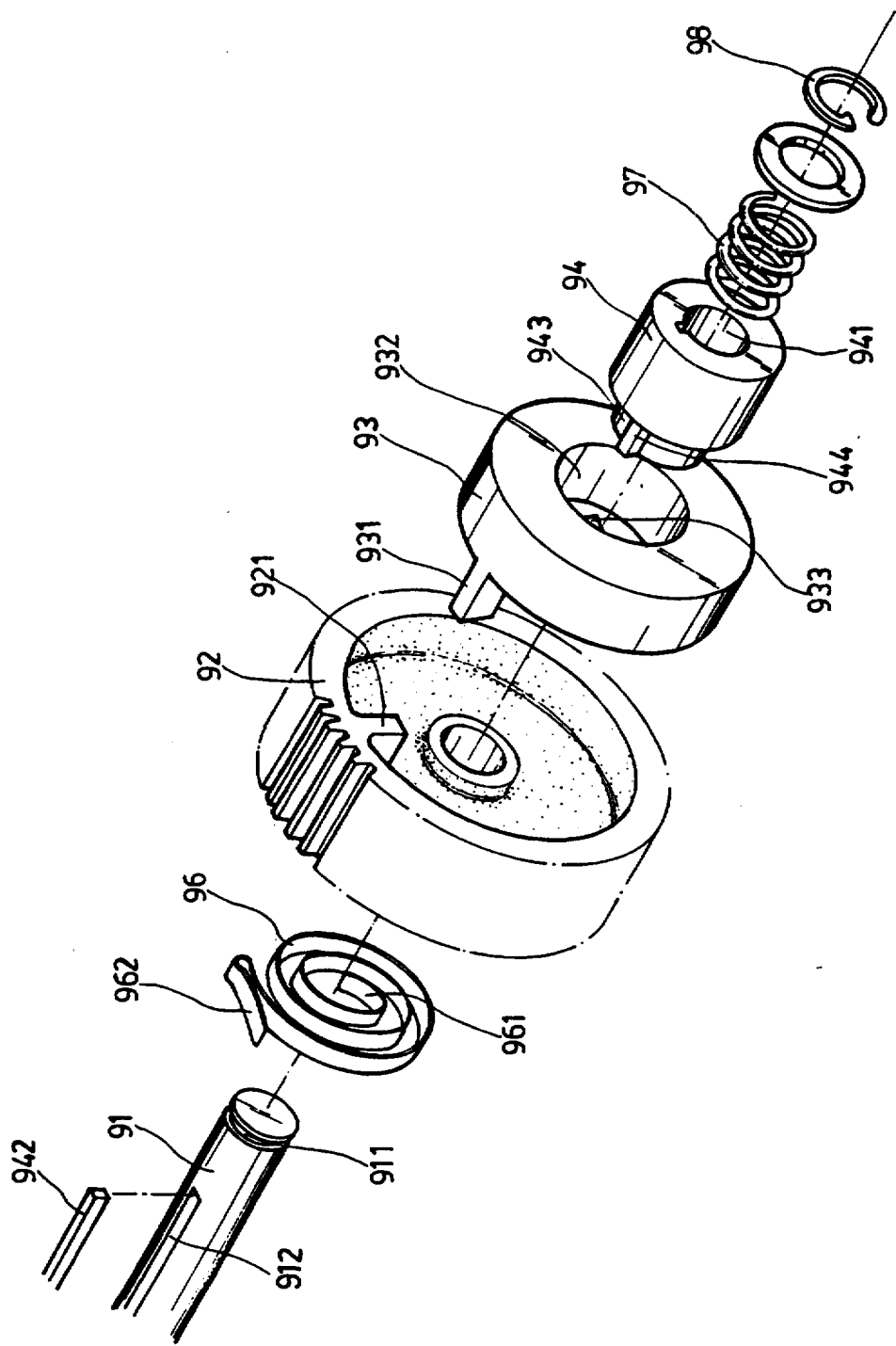
FIG. 14 is an exploded perspective view of a brake device.
Figure 15:
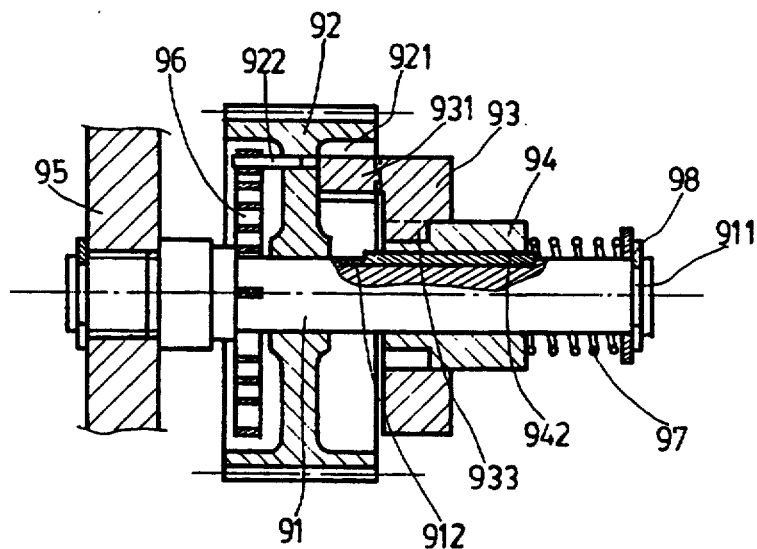
FIG. 15 is a cross sectional view of a brake device.
Figure 16:
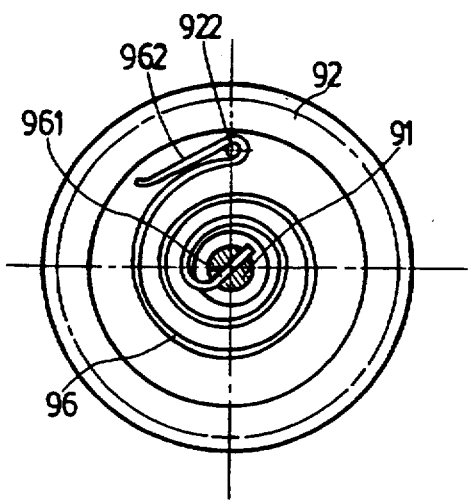
FIG. 16 is a leer side view of the brake device.
Figure 17:
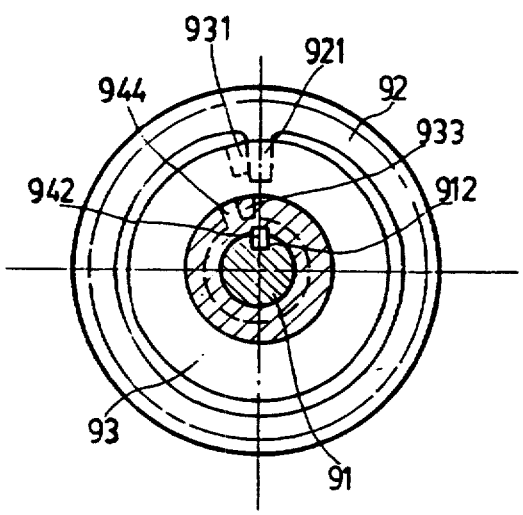
FIG. 17 is a right side view of the brake device.

As shown in FIG. 13, the spring biased positioning pins 852 are disposed at the rotating block 85. When the pedal 82 retracts, the pin 852 is inserted into the hole 843 of the actuating rod 8a. Hence, the pedal 82 is held vertically. When the pedal 82 is extended, the pins 852 are released from the hole 843, then the rotating block 85 can rotate for ninety (90) degrees to retrieve into the recessed hole 844, then the pedal 82 is held horizontally for using. Because the pin 852 is biased outward, hence it can projected into the hole 844 to position the rotating block 85. Meanwhile, the block 844 which disposed within the hole 844 is biased outward and emerges to both sides of the actuating rod 8a. When the pedal 82 is to retract, the block 845 is biased inward to retract the positioning pin 852. Hence, the rotating block 85 is released from the hole 844 accordingly and the pedal 82 retracts smoothly.

On the other hand, the tubular body 86 is disposed at the actuating rod 8a. A circular slot 861 is provided within the tubular body 86. A rectangular slot 862 is disposed at the outer position of the circular slot 861. A shaft hole 863 is provided at the outer portion of the rectangular slot 862. Besides, a spring biased rod 87 is disposed at the upper space 871 of the rectangular slot 862. By the help of the spring member 872, the rod 87 is extended outward to the recessed portion 873 of the actuating rod 8a. When it is pressed by the finger, this rod 87 is extended to the other side of the circular slot 861.

Referring to FIGS. 7 and 8, the actuating rod 8a is fixed to the actuating rod 31a of by means of a screw 83 which passes through the shaft hole 863. The cross section of the actuating rod 8a is rectangular, and the tube 34 has a circular circumference and a rectangular inner channel 343 for receiving the driving shaft 31a. The pin 312 is extended outward of the tube 34 to make the driving shaft 31a to be positioned within the rectangular channel 343. The rectangular slot 862 of the actuating rod 8a is interconnected with the driving shaft 31a. Then a screw 83 is applied to the threaded hole 863 to fix the two.

A compressed spring member 88 is disposed within the tubular body 86. When the spring biased rod 87 is pressed by the finger, the pin 312 is retracted and removed from the hole 340 of the tube 34, consequently, the actuating rod 31a is released therefrom. Then the spring 88 is released to move the driving shaft 31a from the rectangular slot 343 of the tube 34. As shown in FIG. 8, the pedal 82 is released from the actuating rod 8a and held horizontally. A retaining boss 344 is disposed at a suitable position of the tube 34. This retaining boss 344 extends into the sliding slot 311 of the actuating rod 8a. When the end of the sliding slot 311 is blocked by the retaining boss 344, the driving shaft 31a is positioned.

When the actuating rod 8a is to retracted, the user can press the actuating rod 8a toward the rectangular slot 434. A guiding angle 3431 is disposed at the outer portion of the rectangular slot 343 with respect to the pin 312. Then the driving shaft 31a is retracted along rectangular slot 343, the driving shaft 31a is retracted first along the guiding angle 3431 and then extend to the hole 340 of the tube 34.

The actuating rod 8b has the identical configuration with the actuating rod 8a, no further description is given. The driving shaft 31b is identical with the driving shaft 31a. The only difference between the driving shaft 31a, 31b resides on that a passage 313 with larger diameter is provided within the driving shaft 31b. A shaft hole 314 with small diameter is provided at the outer side. A shaft member 315 is inserted into the shaft hole 863 of the actuating rod 8b, consequently, the actuating rod 8b is retained on the driving shaft 31b. On the other hand, a spring member 316 is sleeved onto the shaft member 315 after the shaft member 315 inserts into the passage 313. A nut member 317 is attached to retain the spring thereof. In light of this, a pulling force is applied to the shaft member 315 by the spring 316. Consequently, the actuating rod 8a is retained firmly. When the movement toward outside of the driving shaft 3b is same the driving shaft 3b. The actuating rods 8a, 8b are in the same direction. When the actuating rod 8b is pulled outward, the shaft member 315 is pulled out accordingly. When the driving shaft 31b is released from the rectangular slot 862 of the actuating rod 8b, the actuating rod 8b is rotated one hundred and eighty (180) degrees, then release the actuating rod 8b. By the pulling force of the shaft member 315, the rectangular slot 862 is sleeved onto the driving shaft 3b. Then the pedal 82 is extended from the actuating rod 8b. As shown in the cross sectional view from AA, the pin 312 is disposed at one side of the hole 314, consequently, it will not interfere with the shaft 315.

Many mechanism of this invention need a special brake device 9. The detailed actuating device 9 will be described below with the accompanied FIGS. 14 to 17.

The brake device 9 comprises
- a gear 92 having a stopper 921 at its inner rim portion, a positioning post 911 is disposed inner rim portion;
- a first actuating member 93 is sleeved on the inner portion of the gear 92, a block 931 is provided at the front portion, a hole 932 is provided at the block 931 and a block 933 is disposed inside the hole 932 therein;
- a second actuating member 94, this second actuating member 94 has a hole 941 having a key member 942 at its inner hole 941, the second member 94 has a smaller diameter at the front portion 943 which is received by the hole 932 of said first actuating member 93, a rib portion 944 is provided thereof;
- a shaft member 91 for receiving the gear 92, the first actuating member 93 and the second actuating member 94, the shaft member 91 is disposed on a positioning plate 95 inside the housing;
- a coiled spring member 96 is attached to the shaft member 91 at one end 961 and the other end 962 is attached to the positioning post 922 of the gear 92;
- a spring member 97 is disposed at the outer side of said second actuating member 94, said spring member 97 is fixed to said shaft 91 via a C-clip 98 received at to the ring slot 911, this spring member 97 provides a biasing pressure to said second actuating member 94.

By the above described members, an effective actuating member 9 is assembled.

This assembled actuating member 9 can be applied to many applications to substitute the usage of an electric motor or spring. In utilization, the first actuating member 93 is pulled outward and the second actuating member 94 is moved outward accordingly. By the movement of the key member 942 along the key slot 912 of the shaft member 91, the block 931 of the first actuating member 93 will be released from the block 921 of the gear 92. Then the gear 92 can be rotated counterclockwise to actuate the coil spring 96 to preserve a suitable potential energy. After the potential energy is achieved, the first actuating member 93 is released and moved inward. Then the first actuating member 93 is biased by the second actuating member 94 which is biased by the spring member 97, and the first actuating member 93 is moved inside of the gear 92. By the energy released from the coiled spring 96, a clockwise torque is released from said gear 92.

Since the actuating member 9 is special designed and the first actuating member 93 and second actuating member 94 can be rotated for two winds, as shown in Figures, when the gear 92 moves toward three hundred and sixty degrees (360), the block 921 of the gear 92 will be stopped by the block 931 of the first actuating member 93. If the accompanied gear 33 is still out of preset position, the second actuating member 94 will provide a further assistance. When the gear 92 rotates near a circle, the first actuating member 93 will rotate on the second member 94. Then the block 944 of the second actuating member 94 will engage the block 932 of the first actuating member 93 and stop the rotation of the first actuating member 93. Since the second actuating member 94 is keyed on the shaft member 91, it can moves axially only. Then the gear 92 and the first actuating member 93 is stopped. By this kind of arrangement, the accompanied gear of the gear 92 will be actuated to rotate slowly and naturally without rotating quickly as actuated by the spring 96. This is the design purpose of this brake device 9. In light of this, a safe and secure rotation is achieved by the provision of the actuating device 9. Hence, no added power such as electricity is needed for this sporting equipment. The sporting equipment can operate securely both in operation and even in storage.

As shown in FIGS. 18 to 21, the housing 1 includes a pair of collapsible leg housing 11, 12 at the front and rear portion respectively. A sliding plate 111 is provided within the leg housing 11. An elongate hole 112 is disposed in the sliding plate 111. A rack portion 113 is disposed at one side of the sliding plate 111. A leg socket 114 is disposed at the outside of the sliding plate 111. Besides, the sliding plate 111 extends into the housing 1. On the other hand, the leg 12 which is identical with the leg housing 11 includes a sliding plate 112, elongate hole 112, rack portion 123, leg socket 114 as well. The leg 12 extends into the housing as well. Since the leg housing 11, 12 are disposed symmetrically, the sliding plate 111, 121 and the rack portion 113, 123 are juxtaposed accordingly. On the other hand, a pair of supporting legs 13, 14 are disposed at the let socket 114. A circular bodies 131, 141 are disposed at the end portion of the legs 13, 14 respectively. A gear portions 132, 142 are disposed and meshed respectively on the circular bodies 131, 141. The leg 14 is attached to the rectangular hole 1141 of the leg socket 114 by means of a worm 143 which has a rectangular cross section 1431. The end portion is attached by a nut 144. Then the leg 14 is rotated through ninety (90) degrees. A simplified controller 10 is disposed at the circular body 131 of the leg 13. This controller 10 is attached to the leg socket 113 as well. A partitioning plate 15 is disposed the leg socket 114 between the legs 13, 14. A flat cover 16 is disposed above the legs 13, 14. A leg socket 124 is disposed at the leg 12.

The simplified controller 10 which has a similar configuration with the brake device 9 is disposed at the circular body 131 of the leg 13 and will be described as follow.

Figure 18:
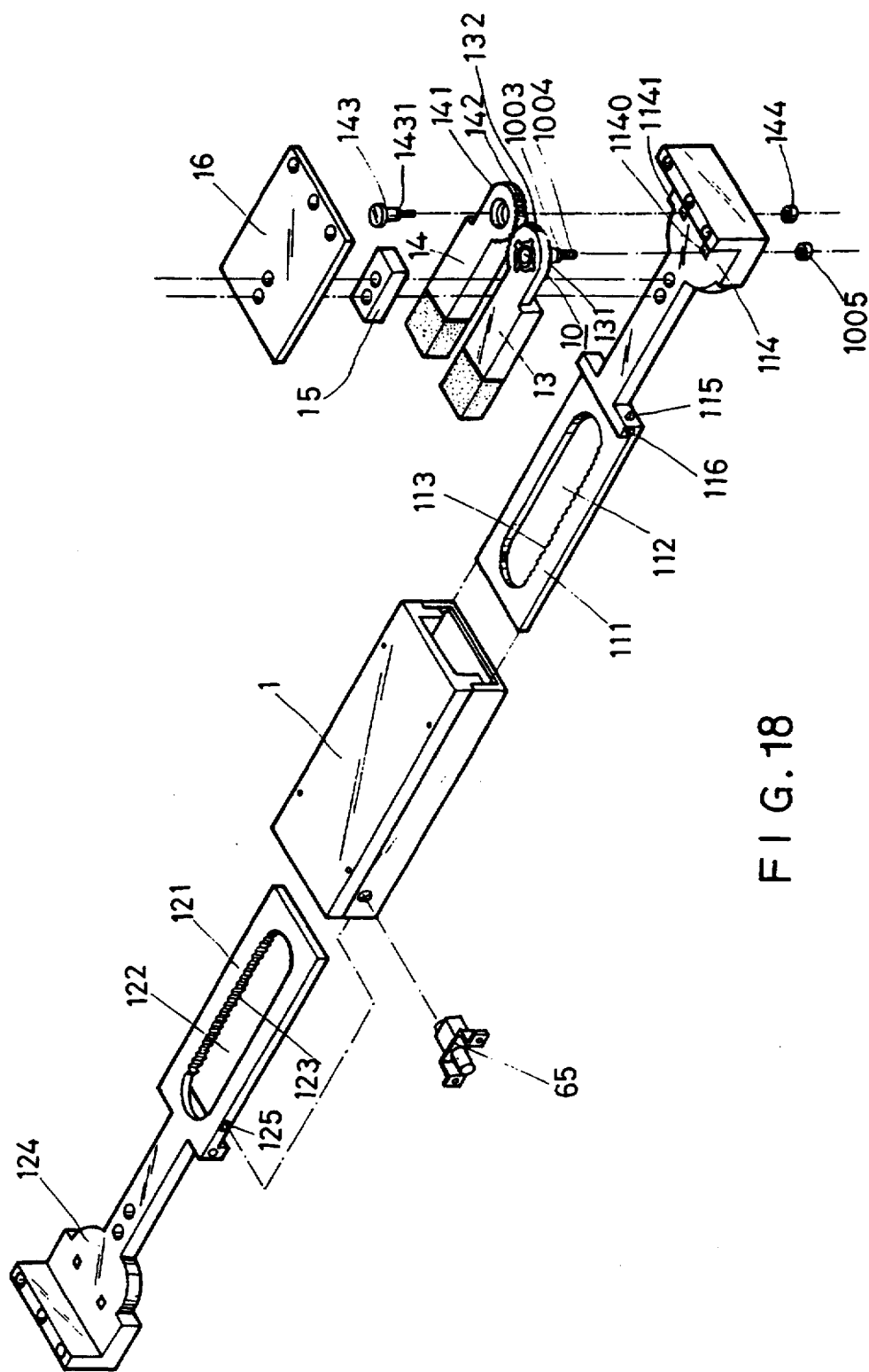
FIG. 18 is an exploded perspective view of the configuration of the housing.
Figure 18A:
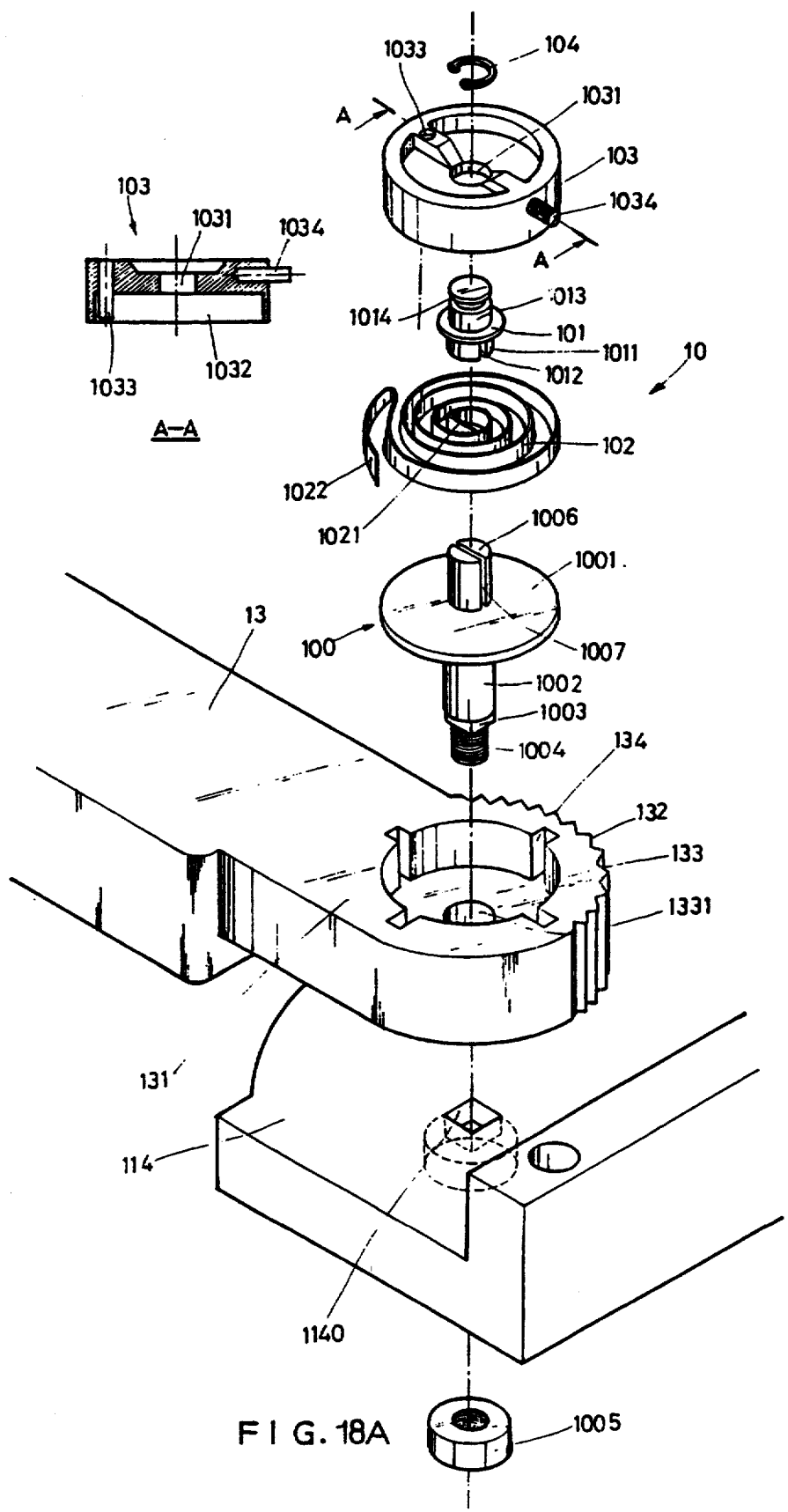
FIG. 18A is an exploded perspective view of the configuration of the leg.

Referring to FIG. 18A, the controller 10 includes a leg 13 which has a circular recessed portion 133 at the circular body 131. A plurality of retaining slot 134 is disposed at the circumference of the recessed portion 133. A hole 1331 is disposed the bottom thereof.

A positioning body 100 has a circular sheet member 1001 at the center portion. The diameter of the sheet member 1001 is small than the circular recess portion 133 and can be received and retained thereof. A shaft member 1002 is connected to the center of the sheet member 1001. A rectangular block body 1003 is attached to the lower portion of the shaft member 1002. The rectangular block body 1003 is received by the rectangular hole 1140 of the leg socket 114. A worm 1004 is further provided at the rectangular block body 1003. This worm 1004 is attached to the leg socket 114 by means of a nut 1005. A post 1006 is disposed at the circular sheet member 1001. This post 1006 further includes a slot 1007 at the center portion.

A connecting sleeve 101 is enveloped to the post 1006. A cutout 1012 is provided thereof with respect to the slot 1007. A shaft member 1013 is disposed above and is disposed with a slot 1014.

A coil spring 102 which has a curve shape is inserted into the cutout 1012 and slot 1007 and fixed thereof.

An adjusting disk 103 is enveloped to the shaft member 1013 by means of the hole 1031 at the center portion. This adjusting disk 103 is attached to the slot 1014 by means of a C-clip 104. A recessed circular portion 1032 for receiving the coil spring 102 is disposed at the center of the adjusting disk 103. A screw 1033 is disposed at the recessed portion 1032 for retaining the end portion 1022 of the coil spring 102. Besides, a screw 1033 is disposed at the peripheral of the adjusting disk 103. This screw 1034 is received by retaining slot 134 of the leg 13.

By the combination of these elements, the coil spring 102 can be wound by the adjusting disk 103 to an extent and then is placed within the recessed portion 133. This coil spring 102 can be positioned by the engagement of the screw 1034 with the retaining slot 134. The positioning body 100 is attached to the leg socket 114. By this arrangement, the leg 13 can be rotated centered on the shaft member 1002. Meanwhile, the leg 14 is rotated accordingly. By this arrangement, the legs 13, 14 are extended and retracted simultaneously to support the housing 1.

Referring to FIGS. 19 and 20, the legs 13, 14 are in a retracted position. A retaining slot 145 is disposed at one of the legs 13, 14. The spring biased pin 115 of the sliding plate 111 is received and positioned within the retaining slot 145 to fix the legs 13, 14 from rotating outward. The pin 115 is controlled by the pressing rod 116. When the pressing rod 116 is depressed, the pin 115 is retracted, consequently the leg 14 is released therefrom. By the torque applied to the leg 13 from the simplified controller 13, the leg 13 together with leg 14 which is meshed thereof is moved outward. Hence, the legs 13, 14 extend smoothly.

Furthermore, the sliding plate 111 of the leg housing 11 extends deep into the housing 1 and under the sliding plate 121 of the rear leg housing 12. Accordingly, the sliding plates 111, 112 are juxtaposed together. On the other hand, a brake device 9 is disposed therebetween such that the gear 92 of the brake device 9 is meshed with the racks 113, 123. The brake device 9 has been described above. When the coil spring member 96 of the brake device 9 actuates the gear 92 to rotates, the sliding plates 111, 121 are moved along opposite direction and them extend outside of the housing 1.

Figure 21:
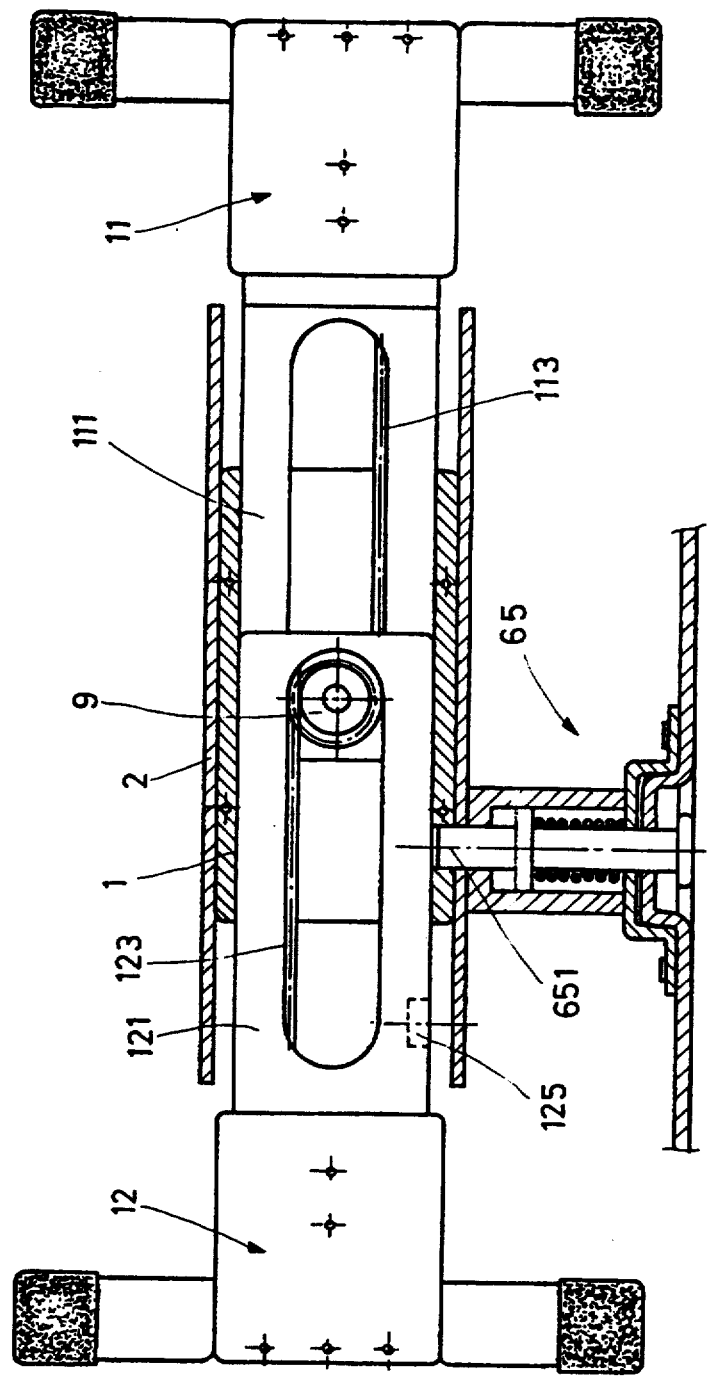
Figure 22:
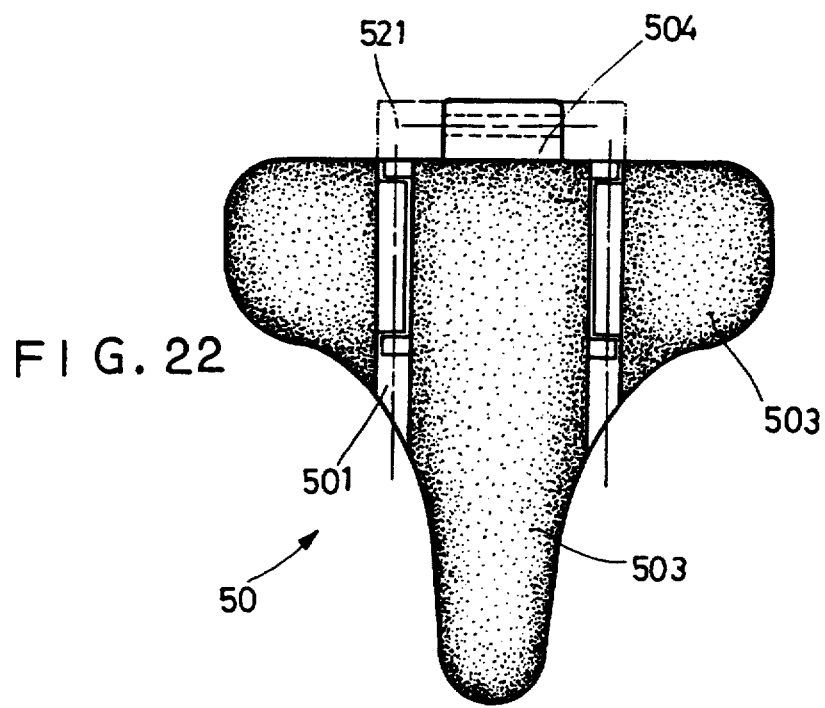
FIGS. 22 to 24 are sketch views of the configuration of the seat.
Figure 23:
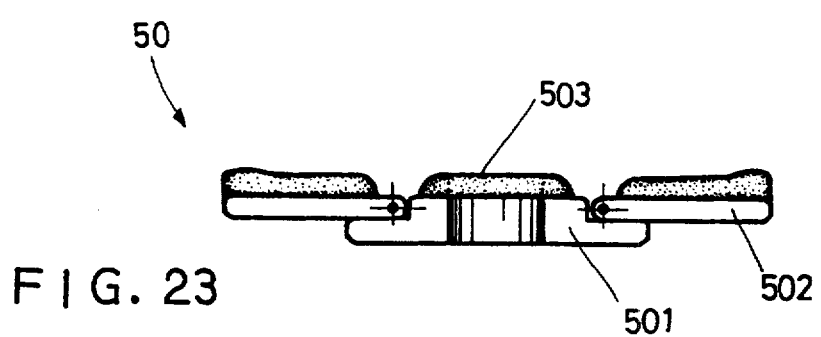

As shown in FIG. 21, the leg housings 11, 12 extend to the outside of the housing 1. A positioning hole 125 is disposed at one side of the sliding plate 121. A controller 65 is attached to the bracket 2 and extend into the housing 1. When the front and rear leg housing 11, 12 are retracted, the brake device 9 is rotated counterclockwise. Then, the spring biased post 651 of the controller 65 is inserted into the positioning hole 125 to fix the sliding plate 121 to a retracted position. When the user hope the leg housings 11, 12 to be extended, the post 651 of the controller 65 can be pulled out to release the sliding plate 121 therefrom, accordingly, the racks 123, 113 are moved along opposite direction by the torque released from the brake device 9. Then the leg housings 123, 113 are moved to a fully extended position.

Figure 24:
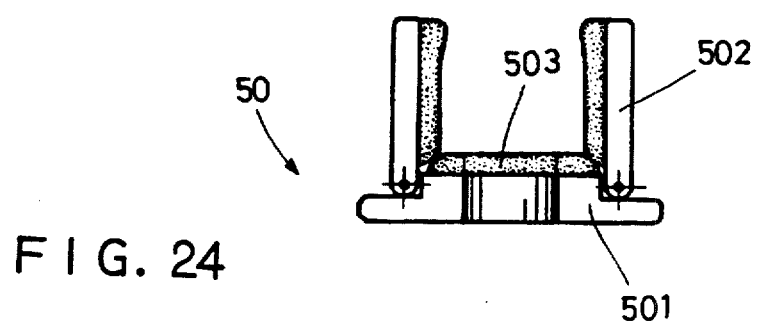

Referring to FIGS. 22 to 25, a telescopic robe and a collapsible seat 50 are disposed within the seat assembly 5. The seat 50 includes a base 501 and a pair of supporting plates 502 which is rotatable through ninety (90) degrees. When the supporting plates 502 are rotated through ninety (90) degrees and positioned thereof, these two supporting plates 502 are held horizontally on the base 501. Besides, a cushion is disposed at the base 501 and the supporting plates 502 to provide a comfortable environment for the user. Besides, a connecting lug 504 is provided at the rear portion of the base 501. A supporting rod 52 is disposed at the center of the lug 504 to connect the lugs 504, 521, as shown in FIG. 25. When the seat 50 is in use, the seat 50 is supported by the supporting tube 52 at the lug 521 and is fixed vertically. When the seat 50 is withstand a load, the weight is supported at the middle or front portion. In light of this, the seat 50 is held firmly when it is supported by the connecting lugs 504, 521. When the seat 50 is to be retracted, the supporting plates 502 are rotated and held vertically, as shown in FIG. 24. Then the base 501 can be rotated backward through two hundred and seventy (270) degrees and stored behind the supporting tube 52.

Figure 26:
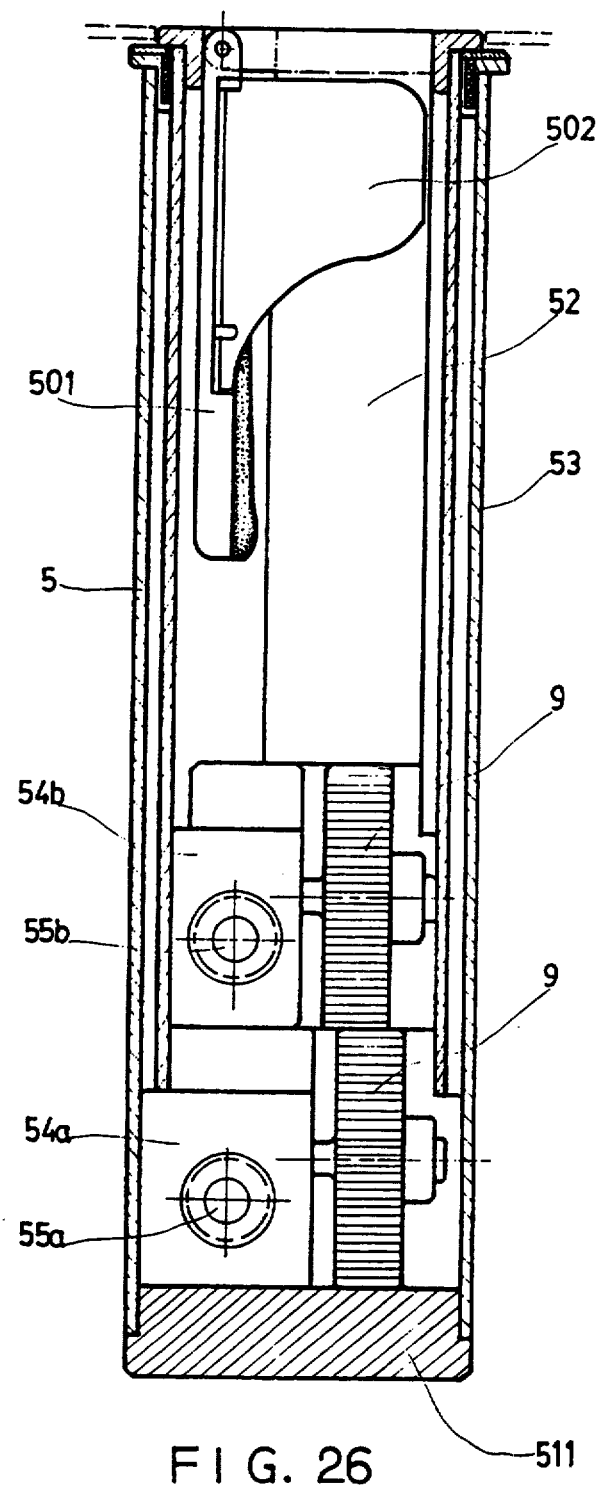
FIG. 26 is a cross sectional view of the seat viewed from side position.
Figure 27:
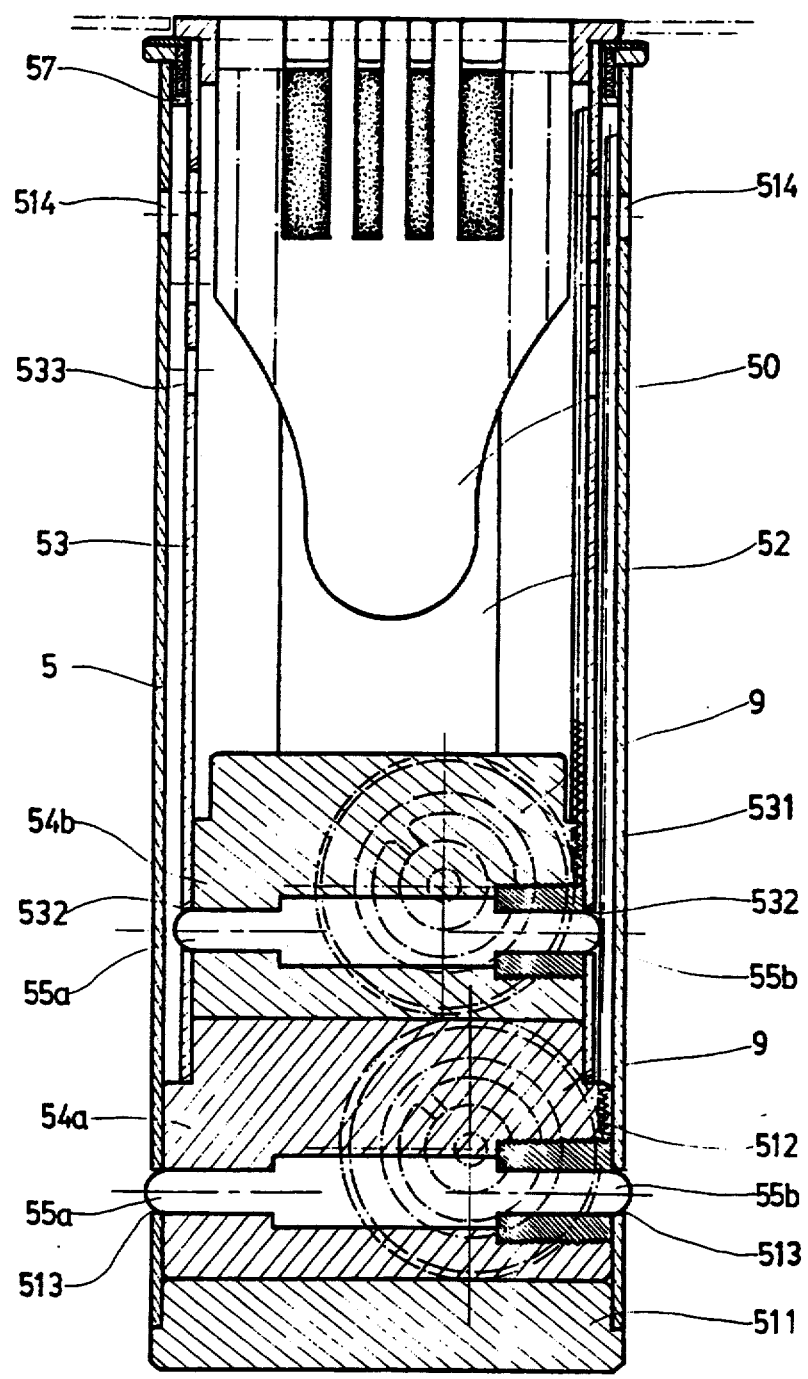
FIG. 27 is a cross sectional view of the seat viewed from the front position.

As shown in FIG. 27, the seat 50 is retracted and stored behind the supporting tube 52. This supporting robe 52 is retracted within an inner tube 53 which is retracted within the seat assembly 5. In use, the inner tube 53 is erected from the seat assembly 5. Then the supporting tube 52 is pulled out from the inner tube 53. As shown in FIG. 1, the seat 50 is rotated through two hundred and seventy (270) degrees from the rear portion of the supporting tube 52. Meanwhile, the supporting plates 502 are extended and held horizontally for user. Referring to FIGS. 26, 27. A positioning block 511 is disposed at the bottom of the seat assembly 5. A rack 512 is disposed at one side and a sliding block 54a is disposed at the bottom of the inner tube 53. A brake device 9 is disposed at one side of the sliding block 54a for meshing with the rack 512. On the other hand, the bosses 55a, 55b are disposed at the sides of the sliding block 54a. These bosses 55a, 55b are received within the hole 513 of the seat 5.

Figure 29:
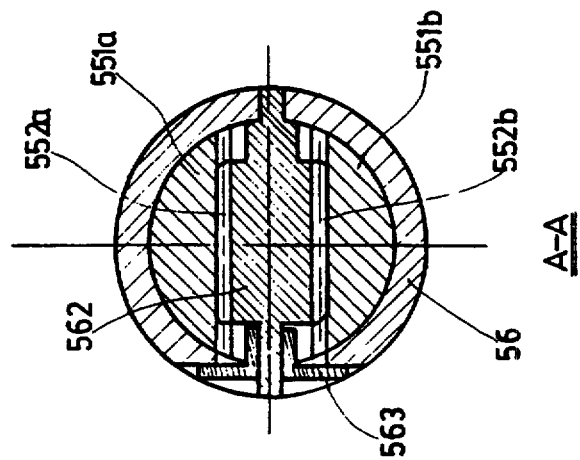
FIGS. 28 and 29 are the sketch view of the configuration of the projected post.
Figure 28:
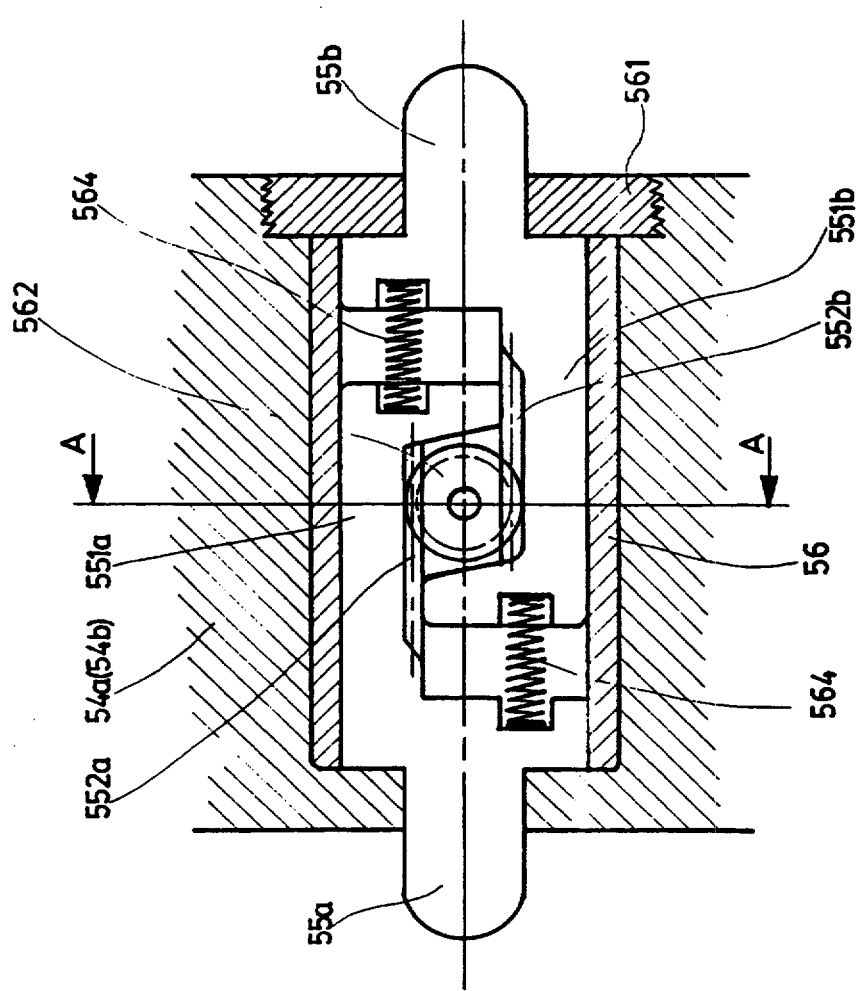

Besides, a sliding block 54b is disposed at the bottom of the supporting tube 52. This sliding block 54b has the same width with the inner portion of the inner tube 53. A brake device 9 is disposed at one side of the sliding block 54b. This brake device 9 is meshed with the rack 531 of the inner tube 53. The sliding block 54b is disposed with a pair of bosses 55a, 55b which are received within the hole 532 of the inner tube 53. Referring to FIGS. 28, 29, the configuration of the bosses 55a, 55b are received into a tube 56. This tube 56 is attached to the sliding block 54a (54b) by means of nut 561. On the other hand, the inner portion 551a, 551b of the bosses 55a, 55b have a circular portion. A recessed portion is defined at the middle portion where the rack 552a, 552b are disposed thereof. A gear shaft 562 is disposed between the racks 552a, 552b. This gear shaft 562 is inserted from one side of the tube 56. A positioning block 563 is disposed to make the gear shaft 562 rotatable within the tube 56. Those bosses 55a, 55b are provided with a spring member 564 at the inner portion. These bosses 55a, 55b are then biased outward and extended beyond the sliding block 54a (54b). When one side of the bosses 55a, 55b is pressed inward, by the help of the gear shaft 562, the bosses 55a, 55b are moved oppositely and released from the retaining of the hole 513. Referring to FIG. 27, when the hole 513 of the seat 5 is pressed, the bosses 55a, 55b are released simultaneously, consequently, the torque from the brake device 9 is applied, the actuation of the brake device 9 is described as referred to FIGS. 14 to 17. The brake device 9 is then moved along the rack 512. Hence the sliding block 54a is moved upward, the inner tube 53 is moved upward accordingly to extend beyond the seat 5.

When the sliding block 54a moves to the upper position, the bosses 55a, 55b are received by the retaining hole 514. A projected portion 57 is disposed within the inner robe 53 and above the seat 5. When the sliding block 54a is moved upward, the sliding block 54b is moved upward accordingly. Before the bosses 55a, 55b of the sliding block 54a reach the retaining hole 514, the bosses 55a, 55b disposed at sides of the tube 53 have reached to the projected portion 57. When the sliding block 54a keeps on moving upward, the bosses 55a, 55b are pressed to retract inward. Then the brake device 9 at the side of the sliding block 54b begins to move upward along the rack 531. As a result, the sliding block 54b and the supporting tube 52 are moved upward and extend beyond the upper portion of the inner tube 53. Therefore, the inner tube 53 is fixed at the upper portion of the seat 5 and the supporting tube 52 is extended at the upper portion of the inner tube 53. By the help of the retaining hole 533 disposed at sides of the supporting tube 53, the height of the supporting tube 52 is adjustable. Accordingly, the height of the seat 50 is adjusted to a suitable position for the user.

Figure 30:
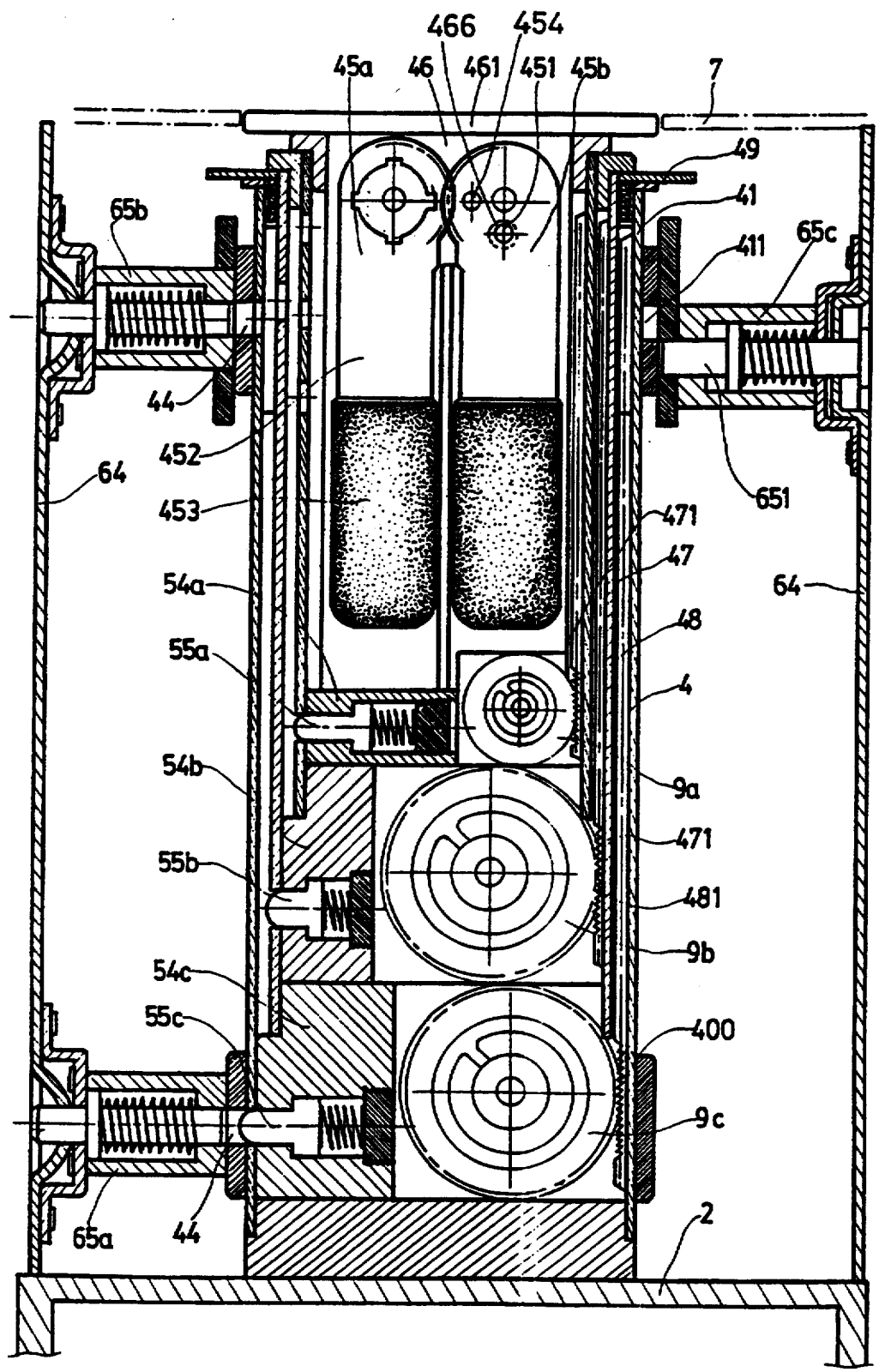
FIG. 30 is cross sectional view of the handlebar viewed from front position.

Referring to FIGS. 30, 31, a sketch view of the configuration of the handlebar 4. The handlebar 4 is fixed to the bracket 2. This handlebar 4 has a pair of positioning plate 64. The handlebars 45a, 45b are retracted into the upper tube 45. The connection, extension and retraction of the handlebar 45a, 45b are identical with the legs 13, 14, therefore, no description is made.

Besides, the upper tube 46 is retracted into a middle tube 47 which is retracted into the lower tube 48, which is retracted into the handlebar 4. The upper tube 46, middle tube 47 and the lower tube 48 can be pulled out from the handlebar 4. These movement are identical with the seat 50 being pulled out from the seat assembly 5. A sliding block 54a, 54b and 54c and brake device 9a, 9b and 9c are disposed with the upper tube 46, middle tube 47 and the lower tube 48 respectively. A rack 471,481 and 400 are disposed at the inner wall of the tube for meshing with the brake device 9. A boss 54a, 54b and 54c are disposed at the outer surface of the tube. The actuation of these tubes 46, 47 and 48 is identical with the seat 5. A controller 65a, 65b and 65c are disposed between the seat 5 and positioning plate 64. When the controller 65b is pressed, the bosses 55c is released from the hole 44c.

Figure 32:
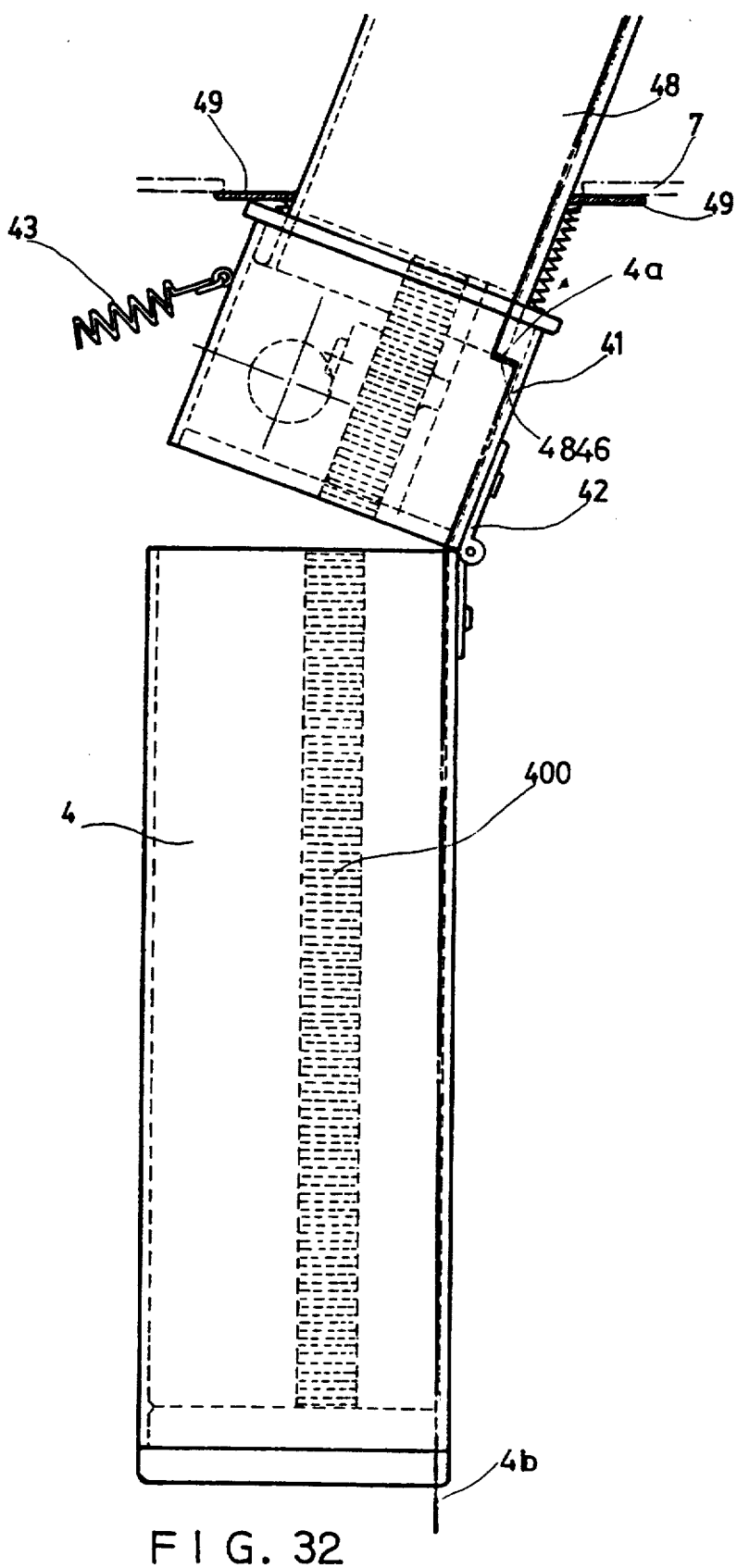
FIG. 32 is a sketch view of the handlebar when extended to an incline position.

Furthermore, the top portion 461 of the upper tube 46 has the same height with the box 7. A spring biased boss 49 is provided at the upper portion of the handlebar 4. When the upper, middle and lower tubes 46, 47 and 48 are pulled out from the handlebar 4, the boss 49 will move the lower portion of the box 7 to fill out the space because the telescopic tubes move upward. As shown in FIG. 32, when the upper, middle and lower tubes 46, 47 and 48 are pulled out from the handlebar 4, a little inclination forward is necessary for a easy operation of the user, as shown in FIG. 1. The pivot center of these tubes is the hinge 42 which connects the upper portion 41 and the handlebar 4. As shown in FIG. 30, when a suitable angle of the these tubes is reached, the post 651 of the controller 65c is inserted into the retaining hole 411 of the upper portion 41 to position it. When the handlebar 4 is to be retracted into a collapsible position, the post 651 is firstly released from the retaining hole 411 and the spring 43 disposed at the opposite position of the hinge 43, see FIGS. 3 and 32, will pull back the upper portion 41 to a vertical position, then these tubes 46, 47, and 48 are easily retracted into the handlebar 4.

As shown in FIG. 31, a pair of handle 45a, 45b are connected to the inner side of the upper tube 46 and a recessed portion 462 which receives a controlling panel 463 is defined at the outer portion. When the upper tube 46 is pulled out, the controlling panel 463 is moved upward to an inclined position, as shown in FIG. 1. An induced circuit 464 is provided at the rear portion of the controlling panel 463 for easy operation of the controlling panel 463. The induced circuit 464a moves downward along the inner wall of the upper tube 46 and form a contact 464b at the bottom portion. An induced circuit 474 is provided at the inner wall of the middle tube 47 which forms a contact 474a at the upper portion and a lower contact 474b at the bottom. When the tube 46 is pulled out, the lower contact 464b will form an electrical contact with the upper contact 474a of the middle tube 47, and the lower contact 474b will form an electrical contact with the upper contact 484a of the induced circuit 484 of the middle tube 48. On the other hand, the lower contact 484b of the lower tube 48 is formed an electrical contact with the contact 4a of the handlebar 4 and the contact 4b is connected to the load adjustor 33 of the transmission box 3 by means of the connecting means 333. As shown in FIG. 3, the induced circuit forms an electric connection and the actual mileage and the load are clearly shown in the controlling panel 463.

When these tubes 46, 47 and 48 are pulled from the handlebar 4, the handle 45a, 45b are extended, as shown in FIGS. 30, 31, the handle 45b is provided with a pair of bosses 451 and 454. The boss 451 will be received by the hole 466 of the upper robe 46 to fix the handle 45a, 45b to a collapsible position. When the boss 451 is pressed to release the handle 45b, the simplified controller 10 disposed at the handle 45a will be easily rotated, the handle 45a, 45b will be rotated simultaneously for ninety degrees, meanwhile, the boss 454 will rotate for a quarter circle and extend into the hole 466, then the handle 45a, 45b will be fixed in a horizontal position. When the boss 454 is pressed to release the handle 45b, the boss 454 is released from the hole 466 until the boss 451 inserts into the hole 466 and forms a collapsible position.

Referring to FIGS. 33 to 35, the handle 45a (45b) extend to a horizontal position. For an easy operation for the user, the handle 45a (45b) has a telescopic structure. An outer robe 453 is sleeved onto the inner tube 452, as shown in FIG. 35. The outer tube 453 can be pulled out to provide a longer length. A boss 4521 is disposed at the rear portion of the inner tube 452 and a retaining slot 4531 is disposed at the front portion of the outer tube 453 and a ring slot 4521 is disposed at the rear portion. A pushing block 4533 which has the same width of the diameter of the outer tube 453 is provided at the ring slot 4532. A compressed spring 454 is disposed within the outer tube 453. When the outer tube 453 is retracted, the boss 4521 is against the side S1 of the ring slot 4532 and position thereof, as shown in FIG. 33. A mark line 4534 is disposed at the outer tube 453 with respect to the pushing block 4533 and the boss 4521 is positioned at the center line. If the user hope to rotate the outer tube 453 clockwise and move the mark line 4564 to the center line. Meanwhile, the boss 4521 which locates inside the ring slot 4532 is depressed by the pushing block 4533. Consequently, the outer tube 453 will be extended outward by the force applied by the compressed spring 454. Accordingly, when the boss 4521 reaches the retaining slot 4531, the boss 4521 presses against the side S2 of the retaining slot 4531 again, then the outer tube 453 is fixed again, as shown in FIG. 35. Besides, the outer tube 453 is enveloped with a cushion for easy hold, as shown in FIG. 1.

This invention can be concluded with the following advantages.

1. The seat 50, handle 45a, 45b and pedal 82 and leg housing 11, 12 can be stored into a box by means of a premium mechanism. A compact box will be easily formed when not in use and these elements can be fully extended in use. The defects of the conventional art are totally solved.

2. As shown in FIGS. 1 and 2, when the bicycle simulator is fully extended, the controller 65 disposed at side of the bracket 2 is firstly pressed. Then the leg housings 11, 12 of the housing 1 are extended. Consequently, the legs 13, 14 are extended to support the housing 1. Then the trigger member 75 is pressed to pull the sliding door 73. The actuating rod 8 and pedal 82 is extended to a position as a normal bicycle. When the controller 65 disposed in front of the pedal 82 is pressed, the tubes 46, 47 and 48 are erected from the handlebar 4. The outer tube 453 is extended to increase the length. The controlling panel 463 is pulled out from the upper tube 46 for operation. Besides, when the controller 65 behind the pedal 82 is pressed, the supporting tube 52 and inner tube 53 is erected from the seat assembly 5. Consequently, the seat 50 is extended. Furthermore, the controlling knob 62 is provided for controlling the load.

3. The bicycle simulator is incorporated with an brake device 9. By this arrangement, the simulator can be easily installed and retracted. No need to electricity or other power. On the other hand, it is absolutely safe.

Although the present invention has been described in connection with preferred embodiments thereof, many other variations and modifications will now become apparent to those skilled in the art without departing from the scope of the invention. It is preferred, therefore, that the present invention not be limited by the specific disclosure herein, but only by the appended claims.

I claim:

1. A bicycle simulator comprising:

a housing having a collapsible front and rear leg housings, a bracket affixed to said leg housings, a first U-type supporter being vertically disposed on a front surface of said bracket, a pair of parallel lugs disposed at an upper portion of said first supporter, a positioning rod disposed between said lugs, a second U-type supporter disposed at a rear portion of said bracket, a plurality of through holes formed through a pair of side walls of each of said first and second supporters;

a transmission box disposed at said upper portion of said bracket, a driving shaft extending to said transmission box, a plurality of gears disposed within said transmission box, said gears being actuated by said driving shaft, a load adjusting device interconnected to said gears, said load adjusting device disposed within said transmission box;

a handlebar housing attached to said first supporter, said handlebar housing having an upper section attached to said handlebar housing by means of a hinge on a rear side, a first end of a spring member connected to a front side of said upper section of said handlebar housing, a second end of said spring member passing through an opening in said first supporter and being connected to a hooker on a handle assembly, said handlebar housing having a plurality of holes for aligned communication with appropriate ones of said through holes of said first supporter;

a seat assembly mounted on said second U-type supporter, said seat assembly having a plurality of holes for aligned communication with said through holes of said second supporter;

a handle assembly mounted to said first and second supporters, said handle assembly having an adjusting knob adjacent a back portion, said adjusting knob being interconnected with said load adjusting device by means of a threaded sleeve;

a pair of positioning plates affixed to said sidewalls of said first and second supporters, the means for affixing each of said positioning plates including a plurality of positioning brackets extending substantially normal to an inner surface of said positioning plate, each of said positioning brackets having a hole for aligned communication with on of said through holes of said first and second supporters, a controller disposed between said holes of said positioning plates and said through holes of said first and second supporters, said positioning plates each having a slot formed therein for passage therethrough of said driving shaft;

a pair of housing covers attached to said bracket, each of said housing covers having a plurality of holes for aligned communication with said holes of one of said positioning plates, each of said housing covers having an elongated recessed surface, said recessed surface being adjacent said slot of one of said positioning plates, said recessed surface having a hole for the extension therethrough of said driving shaft; and, a pair of actuating rods, each of said actuating rods disposed within one of said recessed surfaces, each of said actuating rods having a hole for fixedly receiving therethrough one portion of said driving shaft, each of said actuating rods having attached thereto a pedal.

2. A bicycle simulator as recited in claim 1, wherein a circular body is formed on the end portion of each of the plurality of legs housed within said leg housings each said circular body having formed thereon a gear portion, each said leg being attached to a leg socket by means of a threaded member having a portion with a rectangular cross section passing through a rectangular hole in said leg socket, the end of said threaded member being mated with a nut, said leg being rotatable through ninety (90) degrees, each of said circular bodies having mounted thereon a simplified controller, said controller coupling with said leg socket, a pair of leg sockets having positioned therebetween a partitioning plate, a flat cover shielding said legs.

3. A bicycle simulator as recited in claim 2, wherein said controller is received in appropriate ones of said legs, each of said legs receiving said controller within a circular recessed portion formed into said circular body of said leg, said recessed portion having a plurality of retaining slots formed into a tubular sidewall, said recessed portion having a hole formed at the bottom surface thereof, said controller including:

an elongated positioning body having intermediately formed thereon a circular sheet member, the diameter of said sheet member being less than that of said circular recess portion to allow the retention thereof within said recess portion, said positioning body having a shaft member being connected to and axially aligned with said sheet member and a rectangular block body attached to a lower portion of said shaft member, said rectangular block body being received by said rectangular hole of said leg socket by means of a nut, said sheet member having extending axially therefrom a post having a slot formed along its axial center;

a connecting sleeve coupled to said post, said connecting sleeve having formed thereon a cutout being for aligned communication with said slot of said post and having a shaft section with an annular slot formed thereon, a coil spring which having a spiral shape coupled to said cutout and slot and retained thereby; and an adjusting disk mated with said shaft member by means of a hole formed through its axial center, said adjusting disk being fixed to said slot by means of a C-clip, said adjusting disk having a recessed circular portion for receiving said coil spring about said axial center, a first screw extending into said recessed portion for retaining an end of said coil spring, a second screw extending radially outward from said adjusting disk insert into one of said retaining slots of said leg.

4. A bicycle simulator as recited in claim 1, wherein a seat is retracted and stored behind a supporting tube, said supporting tube being retracted within an inner tube which is retracted within said seat assembly, said seat assembly having a positioning block disposed at bottom of thereof, said inner tune having a rack formed on an inner side and capturing a sliding block disposed bottom portion of said inner tube, said sliding block having a brake device is disposed at a side thereof for meshing with said rack, said sliding block having bosses extending from a side surface of said sliding block, said bosses being received within a hole formed through a side surface of said seat assembly, a second sliding block being disposed at bottom portion of said supporting tube, said second sliding block having width substantially equivalent to the inner diameter of said inner tube, said second sliding block having a brake device disposed at one side thereof, said brake device being meshed with said rack of said inner tube, said second sliding block having a pair of bosses which are received within holes formed through a side surface of inner tube.

5. A bicycle simulator as recited in claim 1, wherein said handle assembly is fixed to said bracket, said handle assembly having a pair of positioning plates, said handle assembly having an upper tube which is retractable into a middle tube which is retractable into a lower tube which is retractable into said handle assembly, said upper, middle, and lower tubes being withdrawn from said handle assembly, a sliding block and a brake device being disposed within said upper, middle, and lower tubes respectively, each of said tubes having a rack disposed at an inner wall surface thereof for meshing with said brake device, a plurality of bosses are disposed at the outer surface of said tubes with a plurality of controllers disposed between a seat and a positioning plate, said bosses being released when respective ones of said controlling are pressed to release said bosses from said holes.

* * * * *